US012573370B2

(12) United States Patent
Ghosh et al.

(10) Patent No.: US 12,573,370 B2
(45) Date of Patent: Mar. 10, 2026

(54) SYNTHETIC SPEECH GENERATION

(71) Applicant: NVIDIA Corporation, Santa Clara, CA (US)

(72) Inventors: Subhankar Ghosh, Santa Clara, CA (US); Boris Ginsburg, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 399 days.

(21) Appl. No.: 17/984,590

(22) Filed: Nov. 10, 2022

(65) Prior Publication Data

US 2024/0161728 A1 May 16, 2024

(51) Int. Cl.

*G10L 13/047* (2013.01)
*G10L 13/08* (2013.01)
*G10L 25/18* (2013.01)
*G10L 25/30* (2013.01)

(52) U.S. Cl.

CPC ............ *G10L 13/047* (2013.01); *G10L 13/08* (2013.01); *G10L 25/18* (2013.01); *G10L 25/30* (2013.01)

(58) Field of Classification Search

CPC ....... G10L 13/047; G10L 13/08; G10L 25/18; G10L 25/30; G10L 13/00; G10L 13/033; G10L 13/04; G10L 13/063; G10L 15/16; G10L 15/26; G06N 3/045; G06N 20/00; G06N 3/08

See application file for complete search history.

(56) References Cited

U.S. PATENT DOCUMENTS

| | | | | |
|---|---|---|---|---|
| 11,158,307 | B1 * | 10/2021 | Ghias | G06N 3/044 |
| 11,605,388 | B1 * | 3/2023 | Gupta | A63F 13/424 |
| 11,900,947 | B2 | 2/2024 | Ghaemmaghami et al. | |
| 12,100,383 | B1 | 9/2024 | Ezzerg et al. | |
| 12,233,338 | B1 * | 2/2025 | Zhong | G10L 17/18 |
| 2008/0270133 | A1 * | 10/2008 | Tian | G10L 15/065 704/251 |
| 2018/0211649 | A1 * | 7/2018 | Li | G10L 13/047 |
| 2020/0058290 | A1 | 2/2020 | Chae et al. | |

(Continued)

FOREIGN PATENT DOCUMENTS

| | | | |
|---|---|---|---|
| CN | 111696572 | A | 9/2020 |
| JP | 2015102667 | A | 6/2015 |
| WO | 2022063758 | A1 | 3/2022 |

OTHER PUBLICATIONS

Garcia-Romero, D. et al., "Speaker Diarization Using Deep Neural Network Embeddings", IEEE International Conference on Acoustics, Speech and Signal Processing (ICASSP), pp. 4930-4934, Mar. 5, 2017.

(Continued)

*Primary Examiner* — Jakieda R Jackson
(74) *Attorney, Agent, or Firm* — Lowenstein Sandler LLP

(57) ABSTRACT

Disclosed are apparatuses, systems, and techniques that may use machine learning for generating artificial speech. The techniques include obtaining a synthetic embedding using learned embeddings associated with different speakers. At least one learned embedding may be generated using a multi-stage training of a machine learning model (MLM) with progressively increasing quality of training speech utterances. The techniques may further include using the MLM and the synthetic embedding to generate synthetic audio data.

19 Claims, 12 Drawing Sheets

(56) References Cited

U.S. PATENT DOCUMENTS

| | | | | |
|---|---|---|---|---|
| 2020/0302223 | A1* | 9/2020 | Dutta | G06V 10/763 |
| 2020/0394997 | A1* | 12/2020 | Trueba | G10L 25/18 |
| 2020/0402497 | A1* | 12/2020 | Semenov | G06N 3/045 |
| 2021/0142782 | A1* | 5/2021 | Wolf | G06N 3/08 |
| 2021/0174791 | A1* | 6/2021 | Shen | G10L 25/84 |
| 2021/0224319 | A1 | 7/2021 | Ingel et al. | |
| 2021/0256960 | A1* | 8/2021 | Daido | G10H 7/002 |
| 2021/0304769 | A1* | 9/2021 | Ye | G10L 15/065 |
| 2021/0390668 | A1* | 12/2021 | Ren | G06T 5/70 |
| 2022/0013106 | A1* | 1/2022 | Deng | G10L 13/033 |
| 2022/0028367 | A1 | 1/2022 | Shekhar et al. | |
| 2022/0029863 | A1* | 1/2022 | Wu | H04L 25/03343 |
| 2022/0051654 | A1* | 2/2022 | Finkelstein | G06N 3/088 |
| 2022/0068256 | A1* | 3/2022 | Jia | G10L 13/033 |
| 2022/0068257 | A1* | 3/2022 | Biadsy | G10L 21/057 |
| 2022/0084166 | A1* | 3/2022 | Navarrete Michelini | G06N 3/048 |
| 2022/0092274 | A1* | 3/2022 | Arivazhagan | G06F 40/47 |
| 2022/0093106 | A1 | 3/2022 | Mosayyebpour Kaskari et al. | |
| 2022/0147876 | A1* | 5/2022 | Dalli | G06N 20/00 |
| 2022/0223144 | A1 | 7/2022 | Sun et al. | |
| 2022/0319018 | A1 | 10/2022 | Gervais et al. | |
| 2022/0343903 | A1* | 10/2022 | Mostafazadeh | G06F 3/0481 |
| 2023/0011337 | A1* | 1/2023 | Qian | G06V 20/52 |
| 2023/0107450 | A1* | 4/2023 | Chang | G10L 15/063 704/240 |
| 2023/0137652 | A1* | 5/2023 | Khoury | G10L 17/20 704/246 |
| 2023/0150498 | A1 | 5/2023 | Seong et al. | |
| 2023/0206898 | A1* | 6/2023 | Stanton | G10L 13/027 704/260 |
| 2023/0386506 | A1* | 11/2023 | Shor | G06N 3/09 |
| 2023/0410789 | A1* | 12/2023 | Sharma | G10L 13/033 |
| 2023/0410814 | A1* | 12/2023 | Yin | G10L 15/063 |
| 2024/0037316 | A1 | 2/2024 | Mohanty et al. | |
| 2024/0046161 | A1* | 2/2024 | Pham | G06N 20/00 |
| 2024/0104055 | A1 | 3/2024 | McAnallen | |
| 2024/0105289 | A1 | 3/2024 | Khan et al. | |
| 2024/0170007 | A1* | 5/2024 | Qian | G10L 21/0272 |

OTHER PUBLICATIONS

Han, W. et al., "ContextNet: Improving Convolutional Neural Networks for Automatic Speech Recognition with Global Context", arXiv preprint arXiv:2005.03191 (2020).

Kingma, D. et al., "Improved Variational Inference with Inverse Autoregressive Flow", 30th Conference on Neural Information Processing Systems, 9 pages, 2016.

Koluguri, N. et al., "Titanet: Neural Model for Speaker Representation With 1D Depth-Wise Separable Convolutions and Global Context", International Conference on Acoustics, Speech and Signal Processing, pp. 8102-8106, May 2022.

Lancucki, Adrian, "Fastpitch: Parallel Text-to-Speech with Pitch Prediction", In ICASSP 2021-2021 IEEE International Conference on Acoustics, Speech and Signal Processing (ICASSP), pp. 6588-6592. IEEE, 2021.

Muller, T. et al., "Neural Importance Sampling", ACM Transactions on Graphics (ToG), vol. 38, No. 5, 2019, pp. 1-19.

Park, T. et al., "Auto-Tuning Spectral Clustering for Speaker Diarization Using Normalized Maximum Eigengap", IEEE Signal Processing Letters, vol. 27, pp. 381-385, 2019.

Park, T. et al., "Multi-Scale Speaker Diarization with Neural Affinity Score Fusion", In ICASSP 2021-2021 IEEE International Conference on Acoustics, Speech and Signal Processing (ICASSP), pp. 7173-7177. IEEE, 2021.

Peng, K. et al., "Non-Autoagressive Neural Text-to-Speech", International Conference on Machine Learning, pp. 7586-7598, 2020.

Ren, Y. et al., "FastSpeech: Fast, Robust and Controllable Text to Speech", 33rd Conference on Neural Information Processing Systems (NeurIPS 2019), 13 pages.

Sasirekha, D. et al., "Text-to-Speech: A Simple Tutorial", International Journal of Soft Computing and Engineering, vol. 2, Issue 1, 4 pages, Mar. 2012.

Shih, K. et al., "Generative Modeling for Low Dimensional Speech Attributes with Neural Spline Flows", arXiv preprint arXiv:2203.01786 (2022).

Valle, R., "Flowtron: an Autoregressive Flow-based Generative Network for Text-to-Speech Sythesis", arXiv preprint arXiv:2005.05957. May 12, 2020.

Chen, J., et al., "VFlow: More Expressive Generative Flows with Variational Data Augmentation," Proceedings of the 37th International Conference on Machine Learning, PMLR, 2020, vol. 119, pp. 1660-1669. Retrived from the Internet: [https://proceedings.mlr.press/v119/chen20p.html].

Doty C., et al., "What Is Speaker Diarization," Deepgram, Aug. 2022, 9 Pages Retrieved from internet URL: https://deepgram.com/learn/what-is-speaker-diarization.

Dumoulin, V., et al., "A Learned Representation for Artistic Style," Computer Vision and Pattern Recognition, ICLR, 2017, 26 Pages. Retrived from the Internet: [https://arxiv.org/abs/1610.07629].

Dupont, E., et al., "Augmented Neural ODEs," 33rd Conference on Neural Information Processing Systems, NeurIPS, 2019, vol. 32, pp. 3140-3150.

Durkan, C., et al., "Neural Spline Flows," Advances in Neural Information Processing Systems, 2019, vol. 32, pp. 7511-7522.

Huang, C.W., et al., "Augmented Normalizing Flows: Bridging the Gap Between Generative Flows and Latent Variable Models," Machine Learning, 2022, 27 Pages. Retrived from the Internet: [https://arxiv.org/abs/2002.07101].

Ito, K., et al., "The LJ Speech Dataset," BibSonomy, 2017. Retrived from the Internet: [https://keithito.com/LJ-Speech-Dataset/].

Jeong, M., et al., "Diff-TTS: A Denoising Diffusion Model for Text-to-Speech," Department of Electrical and Computer Engineering and INMC, 2021, 5 Pages. Retrived from the Internet: [https://arxiv.org/pdf/2104.01409.pdf].

Kawahara, H., et al., "Nearly Defect-free Fo Trajectory Extraction for Expressive Speech Modifications Based on Straight," In Ninth European Conference on Speech Communication and Technology, 2005, 5 Pages.

Kim, H., et al., "Softflow: Probabilistic Framework for Normalizing Flow on Manifolds," Advances in Neural Information Processing Systems, 2020, 10 Pages.

Kim, J., et al., "Glow-TTS: A Generative Flow for Text-to-speech via Monotonic Alignment Search," Advances in Neural Information Processing Systems, 2020b, 11 Pages.

Kingma, D.P., et al., "Glow: Generative flow with invertible 1×1 Convolutions," Advances in Neural Information Processing Systems, 2018, vol. 31, 10 Pages.

Kong, J., et al., "Hifi-gan: Generative Adversarial Networks for Efficient and High Fidelity Speech Synthesis," Advances in Neural Information Processing Systems, 2020, pp. 1-14.

Kong, J., et al., "Hifi-gan: Generative Adversarial Networks for Efficient and High Fidelity Speech Synthesis," 2022, Retrived from the Internet: [https://github. com/jik876/hifi-gan,].

Mauch, M., et al., "Pyin: A Fundamental Frequency Estimator Using Probabilistic Threshold Distributions," In 2014 IEEE International Conference on Acoustics, Speech and Signal Processing (ICASSP), 2014, pp. 659-663.

Mccree, A.V., et al., "A Mixed Excitation Ipc Vocoder Model for Low Bit Rate Speech Coding," IEEE Transactions on Speech and Audio Processing, 1995, vol. 3(4), pp. 242-250.

Miao, C., et al., "Flow-TTS: A Non-autoregressive Network for Text to Speech Based on Flow," IEEE International Conference on Acoustics, Speech and Signal Processing (ICASSP), 2020, 5 Pages.

Moog, B., "MIDI: Musical Instrument Digital Interface," Journal of the Audio Engineering Society, 1986, vol. 34(5), pp. 394-404.

Nakatani, T., et al., "A Method for Fundamental Frequency Estimation and Voicing Decision: Application to Infant Utterances Recorded in Real Acoustical Environments," Speech Communication, Mar. 2008, vol. 50(3), pp. 203-214.

(56) References Cited

OTHER PUBLICATIONS

Park T.J., et al., "Multi-Scale Speaker Diarization With Neural Affinity Score Fusion." IEEE, May 2021, pp. 7173-7177 Retrieved from Internet URL: https://ieeexplore.ieee.org/stamp/stamp.jsptp=&arnumber=9414578.
Ping, W., et al., "Waveflow: A Compact Flow-based Model for Raw Audio," In International Conference on Machine Learning, pp. 7706-7716.
Popov, V., et al., "Grad-TTS: A Diffusion Probabilistic Model for Text-to-Speech," Arxiv Preprint, 2021, 10 Pages.
Ren, Y., et al., "FastSpeech 2: Fast and High-Quality End-to-End Text to Speech," Aug. 8, 2022, 15 Pages. Retrived from the Internet: [https://speechresearch.github.io/fastspeech2/].
Ren, Y., et al., "FastSpeech 2: Fast and High-Quality End-to-End Text to Speech," arXiv:2006.04558v1 [eess.AS] Jun. 8, 2020.
Shih, K.J., et al., "RAD-TTS: Parallel Flowbased Tts With Robust Alignment Learning and Diverse Synthesis," In ICML Workshop on Invertible Neural Networks, Normalizing Flows, and Explicit Likelihood Models, 2021.
Suni, et al., Wavelets for Intonation Modeling in Hmm Speech Synthesis, ISCA, 2013, 7 Pages.
Valle, R., et al., "Flowtron: An Autoregressive Flow-based Generative Network for Text-to-speech Synthesis," In International Conference on Learning Representations, 2020b.
Valle, R., et al., "Mellotron: Multispeaker Expressive Voice Synthesis by Conditioning on Rhythm, Pitch and Global Style Tokens," In ICASSP 2020-2020 Ieee International Conference on Acoustics, Speech and Signal Processing, 2020a, pp. 6189-6193.
Wang, Q., et al., "Speaker Diarization With LSTM," ArXiv, Jan. 2022, 5 Pages Retrieved from internet URL: https://arxiv.org/pdf/1710.10468.
Zhang Y., et al., "Audio segmentation based on multi-scale audio classification." IEEE, Aug. 2004, vol. 4, pp. 349-352 Retrieved from Internet URL: https://ieeexplore.ieee.org/stamp/stamp.jsp?tp=&arnumber=1326835&tag=1.
Raj D., et al., "Dover-Lap: A Method for Combining Overlap-Aware Diarization Outputs," arXiv, Nov. 2020, 8 Pages.

* cited by examiner

SYNTHETIC SPEECH GENERATION

TECHNICAL FIELD

At least one embodiment pertains to processing resources used to perform and facilitate text-to-speech (TTS) synthesis. For example, at least one embodiment pertains to neural networks that facilitate accurate modeling of speech attributes and generation of speech synthesis of high quality.

BACKGROUND

Speech synthesis commonly involves analyzing existing speech samples and correlating various phonemes (units of speech), pauses, and the like in samples of a person's spoken speech with respective text of the speech. The text-phoneme associations gleaned from such analysis can then be applied to generate sound (voice) representations of new text. While simple mechanistic text-to-speech (TTS) synthesis is well developed, high-quality TTS synthesis remains a challenging problem. In particular, various speech attributes, e.g., intonation, volume, etc., vary from occurrence to occurrence, and from text to text, with various contextual attributes (e.g., emotions, type and content of the text, etc.) affecting the specifics of that person's speech. Moreover, even within a single episode of speech, the same person can pronounce the same words slightly differently, depending on the changes in breathing, rhythm, emotions, etc. Deterministic synthetic speech that fails to simulate such natural variations sounds robotic to a human ear, lacks expressiveness, and may fail to capture the attention of a listener.

DETAILED DESCRIPTION

Figure 1:
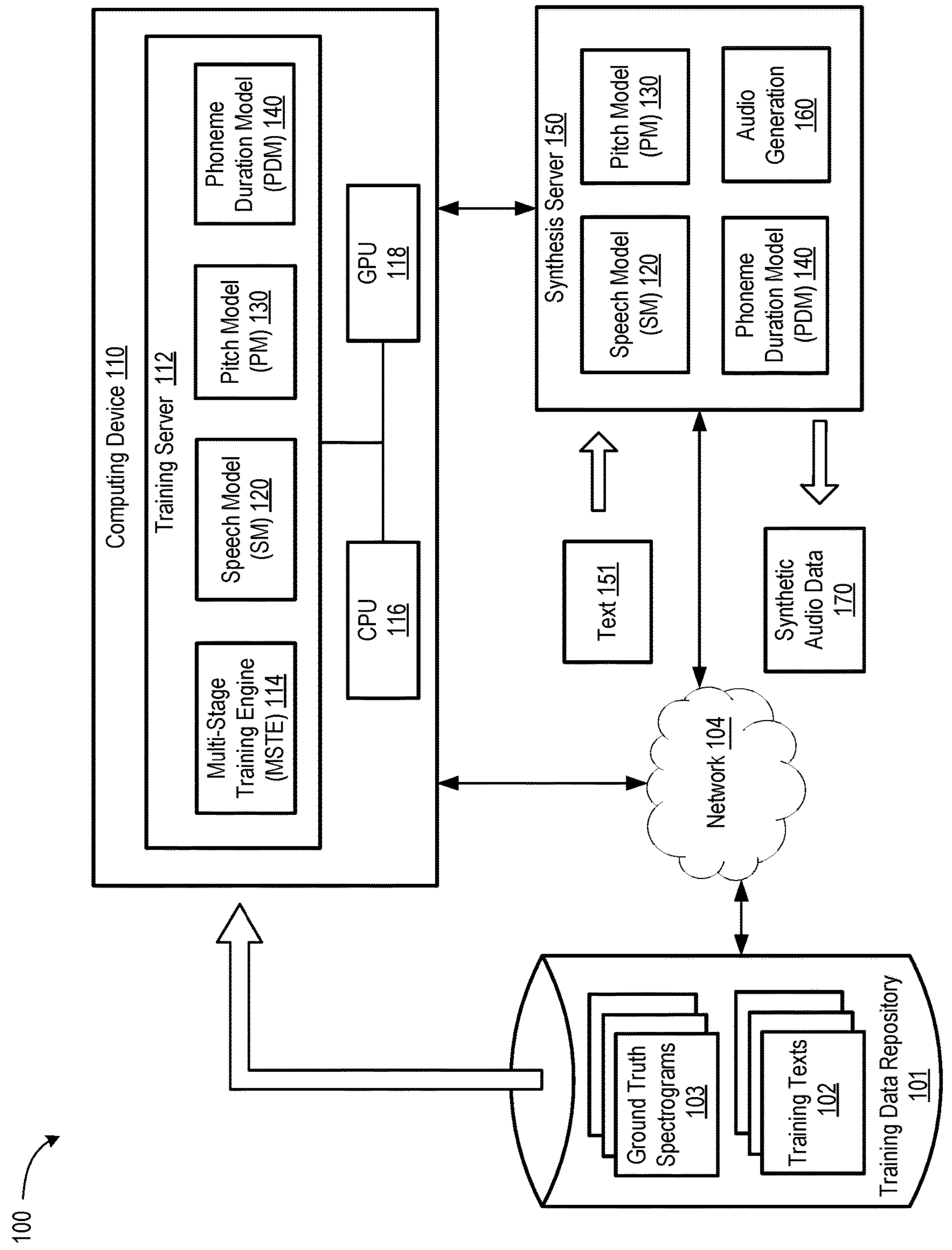
FIG. 1 is a block diagram of an example computer system that uses neural networks for generation of synthetic speech based on speech attributes of multiple speakers, according to at least one embodiment.

TTS modeling beyond simple deterministic speech synthesis has been implemented using a variety of techniques. For example, autoregressive TTS models condition subsequent sounds on multiple previously generated sounds and thus take into account at least some context of the speech. Even though autoregressive TTS models are capable of creating high-quality synthetic speech, these models are often slow in operation. Parallel TTS models process multiple portions of speech concurrently and are, therefore, faster than autoregressive TTS models, but parallel TTS models often fail to account for a temporal context of the speech and occasionally suffer from skipped or repeated words. As a further example, generative TTS models treat a text as a conditional variable and aim to determine probability distributions for pronunciation of various phonemes based on specific values of those conditional variables. Generative models allow sampling from the determined probability distributions during generation of new speech and impart some natural diversity to the generated speech. Unlike autoregressive and parallel models, which account for low-level speech attributes, such as voice pitch, generative models often disregard such attributes. As such, these existing TTS techniques can be more or less successful in synthesizing new speech that sounds as originating from a given person (whose speech samples are used for speech generation), but are much less effective in modeling artificial voices that do not have a specific human prototype.

Voice and speech characteristics of a speaker are typically encoded using speaker embeddings that serve as digital fingerprints of the speaker. A speaker embedding may be viewed as a vector in a special or latent embeddings space. A well-designed and well-trained TTS model should produce speaker embeddings that can be used to generate distinct speech (e.g., speech spectrograms) with natural human-voice attributes. While the existing models—such as those described above—allow some variability of speech (e.g., varying an amount of emotion or pitch), producing speech embeddings capable of being used for generating fully artificial speech attributes remains an open and challenging problem.

There have been attempts to generate speech with artificial speech attributes—such as by using Hidden Markov TTS models to interpolate between two or more real speakers—but these attempts have been unsuccessful in producing natural human-sounding speech. In addition, the ability to produce speech in fully artificial human-like voices that are not traced to actual people is advantageous in privacy-sensitive applications and for engineering various voices with desired characteristics. As such, these prior approaches may satisfy the privacy aspect, but are not capable of doing so in a way that is human-like, thus resulting in systems and methods without wide adoption.

Aspects and embodiments of the present disclosure address these and other technological challenges by disclosing techniques and systems that facilitate generation of synthetic speech using interpolated speech attributes of multiple speakers. The disclosed techniques produce speaker embeddings (alternatively referred to as "resilient speaker embeddings" herein), based on speech utterances of existing (e.g., real human, although artificial utterances may be used as well) speakers, which may be used to produce interpolated speaker embeddings capable of being used to generate synthetic speech in natural-sounding or human-like artificial voices. In some embodiments, resilient speaker embeddings may be produced in the course of training of a suitable TTS model using a multi-stage training process (alternatively referred to as a "funnel approach" herein). More specifically, during a first stage of the training process, the model may be trained using a large number of low-quality speech utterances (samples) produced by a first group of speakers. A training input into the model may include a representation (e.g., a text embedding, a collection of text tokens, etc.) of an utterance spoken by a speaker from the first group, an identification of the speaker, and a group of embeddings associated with the first group of speakers. Initial embeddings may be seeded randomly, or in some other way, and may themselves be learned during the training process. A training output of the model may include audio data, e.g., (mel-) spectrograms of synthetic speech utterances. The training outputs may be compared with target outputs, e.g., spectrograms of the actual (ground truth) utterances produced by a corresponding speaker of the first group, using a suitable loss function (e.g., a mean squared loss function). The computed loss may be used to train the model (e.g., by changing, updating, or adjusting various parameters of the model to reduce the loss) while also changing the embeddings input into the model. As a result, the model learns—in an end-to-end fashion—with each additional training utterance (or a batch of training utterances) while at the same time gradually conditioning the input embeddings to uniquely and efficiently represent different speakers of the first group. Overall, based on the first group of speakers, the model is taught to distinguish speech features of many speakers in a way that is robust against noise and various recording defects and artifacts.

During the second stage of the training process, the model may be trained using higher-quality utterances produced by a smaller group of speakers (e.g., tens or fewer speakers). This teaches the model to learn high-quality embeddings while still retaining the learned resilience against noise and other audio imperfections. The second stage may start with the model having parameters trained during the first stage and may use similar training inputs and target outputs as in the first stage. Similarly, a new set of the input embeddings is gradually conditioned to uniquely represent high-quality speech of different speakers of the second group. The generated embeddings and the trained model may then be used to generate synthetic speech. More specifically, two or more embeddings (e.g., high-quality embeddings learned for the speakers of the second group) may be combined—e.g., as a linear weighted combination—to produce a synthetic embedding. The synthetic embedding may be processed by the trained model together with a representation of new text to produce an audio of the synthetic speech in the artificial voice defined by the synthetic embedding. A resulting benefit is that the resilient embeddings generated using the multi-stage (funnel) training approach can be combined into new embeddings that likewise produce a natural human-sounding speech.

In some embodiments, three or more stages of increasing quality audio data (and, optionally, decreasing the number of speakers) may be used during the multi-stage training. In some embodiments, the model may include one or more neural networks. In some embodiments, the model may include a first subnetwork trained to generate audio characteristics (e.g., pitch frequency) for various units (e.g., phonemes, words, sub-words, etc.) of speech. In some embodiments, the model may include a second subnetwork trained to determine timing (duration) of various units of speech. The first subnetwork and the second subnetwork may be parallel subnetworks and may each include one or more layers of one-dimensional convolutions and/or one or more fully-connected layers. In some embodiments, the first subnetwork and the second subnetwork may be trained using separate loss functions and ground truths that include phoneme durations and pitch for various phonemes of the actual speech. In some embodiments, the model may include one or more transformer subnetworks with memory layers. Numerous other embodiments are described herein.

The advantages of the disclosed techniques include, but are not limited to, systems and methods that produce embeddings that are both resilient to noise and capable of generating artificial speech of high quality even when embeddings for different speakers are interpolated or otherwise combined. This improves the overall quality of speech synthesis and further allows creation of artificial speech by fully synthetic speakers with speech characteristics that go far beyond minor modifications of speech characteristics of real speakers. Accordingly, the disclosed techniques allow creation of numerous artificial voices, e.g., by interpolating embeddings of different speakers or groups of speakers, weighting different speaker embeddings with different weights, and so on. Additionally, the disclosed techniques ensure privacy of real speakers whose speech and voice samples are used in generating the artificial speech.

System Architecture

FIG. 1 is a block diagram of an example computer system 100 that uses neural networks for generation of synthetic speech based on speech attributes of multiple speakers, according to at least one embodiment. As depicted in FIG. 1, a computing system 100 may include a training data repository 101 and a computing device 110 hosting a training server 112. Training data repository 101 and computing device 110 may be connected to a network 104. Network 104 may be a public network (e.g., the Internet), a private network (e.g., a local area network (LAN), a wide area network (WAN)), a wireless network, a personal area network (PAN), a combination thereof, and/or another network type. Computing system 100 may be configured to process text 151 to generate synthetic audio data 170 that may include a suitable audio representation of text 151, e.g., a spoken version of text 151 synthesized based on prior speech samples stored in data repository 101. In some embodiments, synthetic audio data 170 may correspond to an artificial speaker whereas prior speech samples may be produced by real speakers. Prior speech samples may include suitable audio data, e.g., training spectrogram(s) 103, characterizing speech of a person pronouncing a respective training text 102. A training spectrogram 103 may be obtained by recording air pressure caused by the speech as a function of time and computing a short-time Fourier transform for overlapping time intervals (frames) of a set duration. This maps the audio signal from the time domain to the frequency domain and results in a training spectrogram 103 characterizing the spectral content of the speech. The amplitude of the audio signal may be represented on a logarithmic (decibel) scale. In some embodiments, the obtained spectrograms may be further converted into mel-spectrograms, by transforming frequency f into a non-linear mel domain, f→m=a ln(1+f/b), to take into account the ability of a human ear to distinguish better equally spaced frequencies (tones) at the lower end of the frequencies of the audible spectrum than at its higher end; for example, a=1127 and b=700 Hz. Throughout this disclosure, the term spectrogram should also be understood to include, in embodiments, mel-spectrograms.

Training text(s) 102 and training spectrogram(s) 103 may be used by a training server 112 to identify features of speech that may subsequently be used by synthesis server 150 to synthesize new speech for text 151 previously not seen by computing system 100 and in an artificial voice and having speech attributes that are different from voice and speech attributes of existing speakers. Training server 112 may be hosted by computing device 110. Computing device 110 may include a desktop computer, a laptop computer, a smartphone, a tablet computer, a server, a wearable device, a VR/AR/MR headset or heads up display, a digital avatar or chat bot kiosk, an in-vehicle infotainment computing device, and/or any suitable computing device capable of performing the techniques described herein.

Training server 112 may train a number of machine learning models, which in some embodiments may be neural network models. In some embodiments, training server 112 may deploy a multi-stage training engine (MSTE) 114 to implement multiple stages of training of a speech model (SM) 120. SM 120 may use, as an input, a digital representation of a text (e.g., training text) and a digital representation of speech attributes of a given (actual or synthetic) speaker and generate, as an output, audio data for a synthetic speech produced by the given speaker. For example, the digital representation of a text may include an embedding (e.g., a set of tokens) that represents, using any suitable encoding scheme, a set of alphanumeric symbols (e.g., letters, numbers, glyphs, etc.) and/or punctuation marks of the text. The digital representation of speech may include an embedding (or a sequence of multiple embeddings) that encodes speech features of the speaker. The embedding(s) may be learned, as described in more detail herein, in the course of training of SM 120 by MSTE 114.

During training, the learned embeddings may include representations of speech features of real speakers. During inference, the embeddings may include representations of artificial speech features of synthetic speakers derived using speech features of real speakers learned during training. The audio data output by SM 120 (in training and/or inference) may include spectrograms (e.g., mel-spectrograms) of the speech generated using the speaker embeddings for specific input texts. During training, MSTE 114 may use a suitable loss function to evaluate a difference between the output audio data and a ground truth audio data (which may include audio spectrograms of real speakers) and use the loss function to modify/update/adjust parameters of the SM 120 and any pertinent subnetworks of SM 120, e.g., to reduce or minimize the evaluated difference. In some embodiments, subnetworks of SM 120 may include a pitch model (PM) 130 configured and trained to generate audio characteristics (e.g., fundamental pitch frequency p(t) and/or energy e(t) or volume) for various units (e.g., phonemes) of speech. In some embodiments, characteristics of speech may include fundamental frequency (pitch) p(t) and/or volume or energy e(t) of the speech. In some embodiments, subnetworks of SM 120 may include a phoneme duration model (PDM) 140 configured and trained to determine timing (duration) of various phonemes of speech. In some embodiments, PM 130 and/or PDM 140 may be trained (e.g., pre-trained) separately from SM 120. In some embodiments, PM 130 and/or PDM 140 may be trained together with SM 120, e.g., using a loss function that evaluates errors in the generated audio characteristics and/or errors in timing together with errors in the output spectrograms. In some embodiments, separate loss functions may be used to evaluate errors in audio characteristics, timing and/or the output spectrograms.

In some embodiments, training data repository 101 may include a persistent storage capable of storing textual files, audio files, audio spectrogram data, and/or various metadata for the stored data. Training data repository 101 may be hosted by one or more storage devices, such as main memory, magnetic or optical storage disks, tapes, or hard drives, network-attached storage (NAS), storage area network (SAN), and so forth. Although depicted as separate from computing device 110, in at least one embodiment, training data repository 101 may be a part of computing device 110. In at least some embodiments, training data repository 101 may be a network-attached file server, while in other embodiments training data repository 101 may be some other type of persistent storage, such as an object-oriented database, a relational database, and so forth, that may be hosted by a server machine or one or more other machines coupled to the computing device 110 via one or more networks 104.

Computing device 110 may include one or more memory devices or units (not shown in FIG. 1) communicatively coupled with one or more processing devices, such as one or more central processing units (CPU) 116 and/or one or more graphics processing units (GPU) 118, (and/or other parallel processing units (PPUs) or accelerators, such as a deep learning accelerator, a data processing unit (DPU), etc.). The memory of computing device 110 may store executable codes, libraries, and various dependencies of training server 112 and one or more models that are being trained thereon, e.g., speech model 120, pitch model 130, phoneme duration model 140, and/or the like. Training server 112 may be executed by CPU 116, GPU 118, another processor type, an accelerator, or a combination thereof. In at least one embodiment, GPU 118 may include multiple cores, each core being capable of executing multiple GPU threads. One or more cores may run multiple threads concurrently (e.g., in parallel). In at least one embodiment, threads may have access to registers. One or more cores may include a scheduler to distribute computational tasks and processes among different threads of the respective core. A dispatch unit may implement scheduled tasks on appropriate threads using various private registers and shared registers. In at least one embodiment, GPU 118 may have a (high-speed) cache, access to which may be shared by multiple cores (e.g., all cores). Furthermore, computing device 110 may include a GPU memory in which GPU 118 may store intermediate and/or final results (outputs) of various computations performed by GPU 118. Training server 112 may determine which processes are to be executed on GPU 118 and which processes are to be executed on CPU 116.

In at least one embodiment, synthesis server 150 may be a part of computing device 110. In other embodiments, synthesis server 150 may be communicatively coupled to computing device 110 directly or via network 104. Training server 112 and/or synthesis server 150 may include (and/or include) a rackmount server, a router computer, a personal computer, a laptop computer, a tablet computer, a desktop computer, a tablet computer, a server, a wearable device, a media center, another device type, or any combination thereof.

Multi-Stage Training of Text-to-Speech Models

Figure 2A:
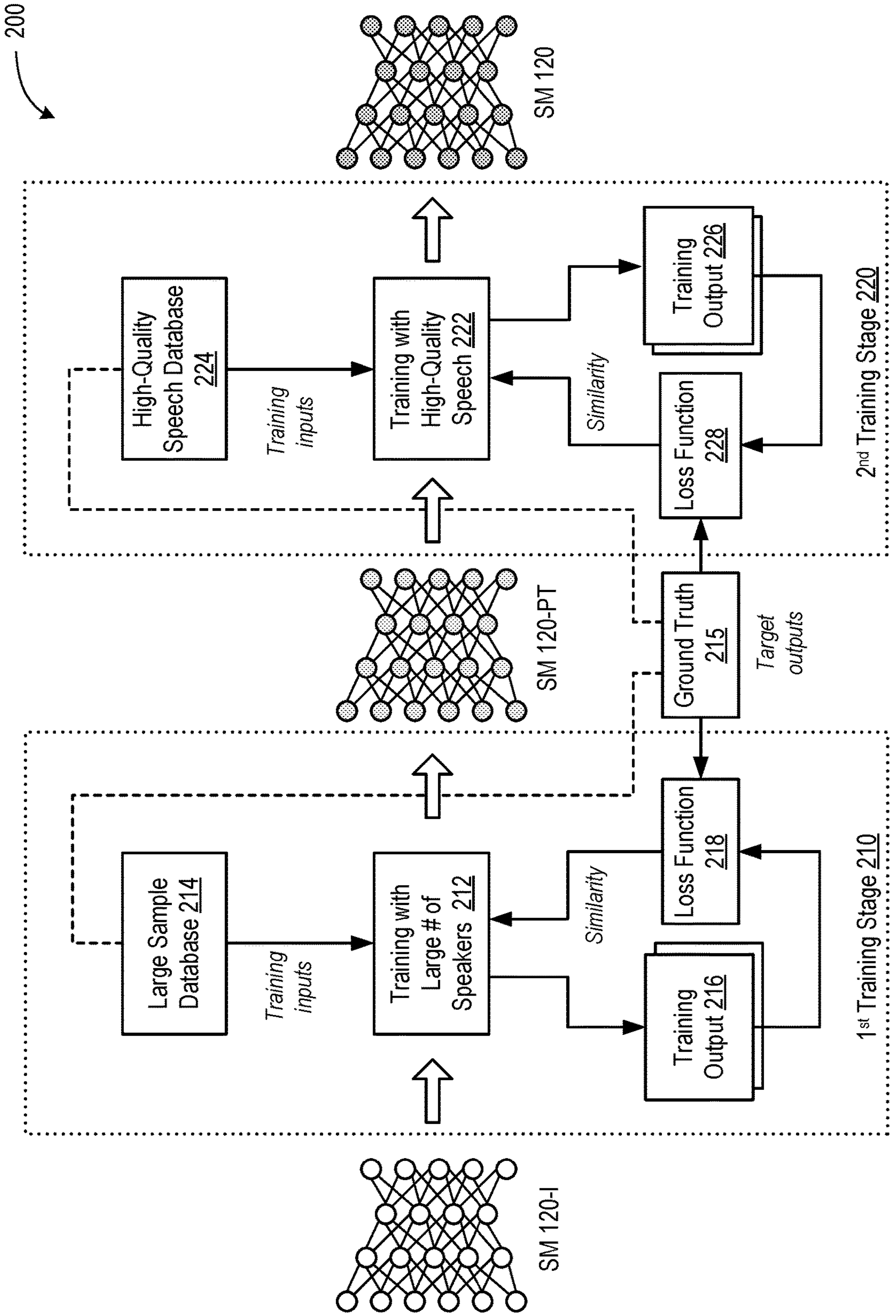
FIG. 2A illustrates an example training architecture for training of neural networks capable of generating synthetic speech based on speech attributes of multiple speakers, according to at least one embodiment.

FIG. 2A illustrates an example training architecture 200 for training of neural networks capable of producing outputs used for generating synthetic speech based on speech attributes of multiple speakers, according to at least one embodiment. In at least one embodiment, training architecture 200 may be implemented by training server 112. In some embodiments, training architecture 200 may be implemented by MSTE 114 of FIG. 1. Training architecture 200 may be used to train any suitable TTS model, e.g., SM 120 of FIG. 1. SM 120 may be an autoregressive TTS model, a parallel TTS model, a generative TTS model, and/or so on. At the start of training, a developer (or a computer program, e.g., MSTE 114 of FIG. 1) may initialize SM 120 by defining a neural network architecture of SM 120, including a number of neuron layers, blocks of layers, a number of nodes (neurons) in various neuron layers, the types of layers, e.g., convolutional layers, linear layers, dropout layers, normalization layers, etc., a number, dimensions, and stride of filters deployed by convolutional layers, types of activations functions used in different layers, and so on. At the start of training, initialized SM 120, denoted herein via SM 120-I, may have parameters (e.g., weights and biases) that are assigned some starting values, e.g., fixed values or values randomly seeded by MSTE 114.

During training of a machine learning model (e.g., SM 120), MSTE 114 may select a training input and apply the speech model to the selected training input to generate a training output. MSTE 114 may then compare the training output with the target output (ground truth) and evaluate the observed mismatch using a loss function. The mismatch may be back-propagated through the model (e.g., using gradient descent techniques), and the weights and biases of the model may be adjusted to make the training outputs evolve in the direction of the target outputs. Such adjustments may be repeated—over any number of iterations, epochs, etc.—until the output mismatch for a given training input satisfies a predetermined condition (e.g., falls below a predetermined value, converges to an acceptable level of accuracy, etc.). Subsequently, a different training input may be selected, a new training output generated, and a new series of adjustments implemented based on a mismatch with the target output, until the model is trained to a target degree of accuracy.

As illustrated in FIG. 2A, the described training process may be performed in multiple training stages. More specifically, a first training stage 210 may include training with a large number of speakers, denoted schematically with block 212. The first training stage 210 may prioritize a number of speakers over quality of speech samples (utterances). Correspondingly, a large sample database 214 may include speech samples produced by a first group of $N_1$ speakers, e.g., hundreds or even more speakers. Any speaker of the first group of speakers may generate one, two, three, or more (e.g., tens or more) utterances in the large sample database 214. Individual utterances may be several seconds or longer in duration. An average quality of speech samples in the large sample database 214 may be characterized by some value $Q_1$, e.g., a signal-to-noise ratio (SNR) measured in decibels or other suitable units. In some embodiments, speech samples in the large sample database 214 may have a minimum quality value $q_1$ so that utterances of very low quality do not contaminate training. For example, samples with $Q_1<q_1\equiv 0$ dB (e.g., samples in which the level of noise exceeds the level of the audio signal) may be excluded from the large sample database 214. Any other (e.g., empirically-selected) value $q_1$ may serve as the minimum SNR value.

In addition to speech utterances, the large sample database 214 may include texts (e.g., text transcripts) of those utterances. During a given round of training, MSTE 114 may select an utterance (or a batch of utterances) in the large sample database 214 and use the corresponding texts (or a batch of texts) as training inputs into SM 120. SM 120 may process the input texts to generate training audio data (training outputs 216), e.g., spectrograms of speech representing pronunciation of the respective texts. As described in more detail herein at least in conjunction with FIG. 3, training inputs may also include speaker embeddings for identification of speech features of various speakers in the large sample database 214. During training, SM 120 may learn to perform several tasks: (i) to distinguish different speakers in the large sample database 214 by developing speaker embeddings that digitally represent speech features of a particular speaker; (ii) to generate audio data (e.g., spectrograms) that closely approximates actual (ground truth) audio data in the large sample database 214; and (iii) to associate the audio data with correct speaker embeddings. Such learning may be assisted by evaluating, using a loss function(s) 218, a similarity (or mismatch) between training outputs 216 (e.g., synthetic audio data) and ground truth 215 (target outputs that include the actual audio data). The similarity (or mismatch) may be back-propagated through SM 120 and the weights and biases of SM 120 may be modified to make the training outputs 216 closer to ground truth 215. As indicated with the dashed line connecting the respective blocks, ground truth 215 may also include correct identifications of various speakers in the large sample database 214. The output of the first training stage 210 may be a partially trained speech model, denoted herein as SM 120-PT. The first training stage 210 teaches SM 120 to distinguish speech features of many speakers in a way that is robust against noise and various recording defects and artifacts.

A second training stage 220 may include training with high-quality speech utterances (denoted schematically via block 222). The second training stage 220 may prioritize quality of speech samples over a number of speakers. More specifically, a high-quality speech database 224 may include speech samples produced by a second group of $N_2$ speakers, e.g., tens or even fewer speakers. Each of $N_2$ speakers may generate one, two, three, or more (e.g., tens or more) utterances that are included in the high-quality speech database 224. Each of the utterances may be several seconds or longer in duration. An average quality of speech samples in the high-quality speech database 224 may have a value $Q_2$, e.g., an SNR value. The average quality of speech samples in the high-quality speech database 224 may be larger than the average quality value of speech samples in the large sample database 214, $Q_2>Q_1$. In some embodiments, the high-quality speech database 224 may have a minimum quality value $q_2$ that is larger than the minimum quality value of speech samples in the large sample database 214, $q_2>q_1$. In some embodiments, the number of speakers s in the high-quality speech database 224 may be smaller than the number of speakers in the large sample database 214, $N_2<N_1$.

Similar to the large sample database 214, the high-quality speech database 224 may include speech utterances and texts of the utterances. Training with high-quality speech (block 222) may be performed similarly to training with a large number of speakers (block 212) of the first training stage 210. In particular, SM 120 may process the input texts associated with speech utterances from the high-quality speech database 224 to produce, as training outputs 226, training audio data corresponding to pronunciation of the respective texts. Training inputs may also include speaker embeddings for identification of speech features of various speakers in the high-quality speech database 224. A loss function 228 may then evaluate a similarity (or mismatch) between training outputs 226 (e.g., synthetic audio data) and ground truth 215 (target outputs). The similarity (or mismatch) may be back-propagated through SM 120 and the weights and biases of SM 120 may be modified to bring the training outputs 226 closer to ground truth 215. Loss function 228 may be the same as loss function 218. In some embodiments, loss function 228 may be different from loss function 218. As indicated with the dashed line connecting the respective blocks, ground truth 215 may also include correct identifications of various speakers in the high-quality speech database 224. The second training stage 220 teaches SM 120 to correctly represent high-quality speech while still retaining the learned (during the first training stage 210) resilience against noise and other audio imperfections. The output of the second training stage 220 may be a fully trained speech model SM 120.

Figure 2B:
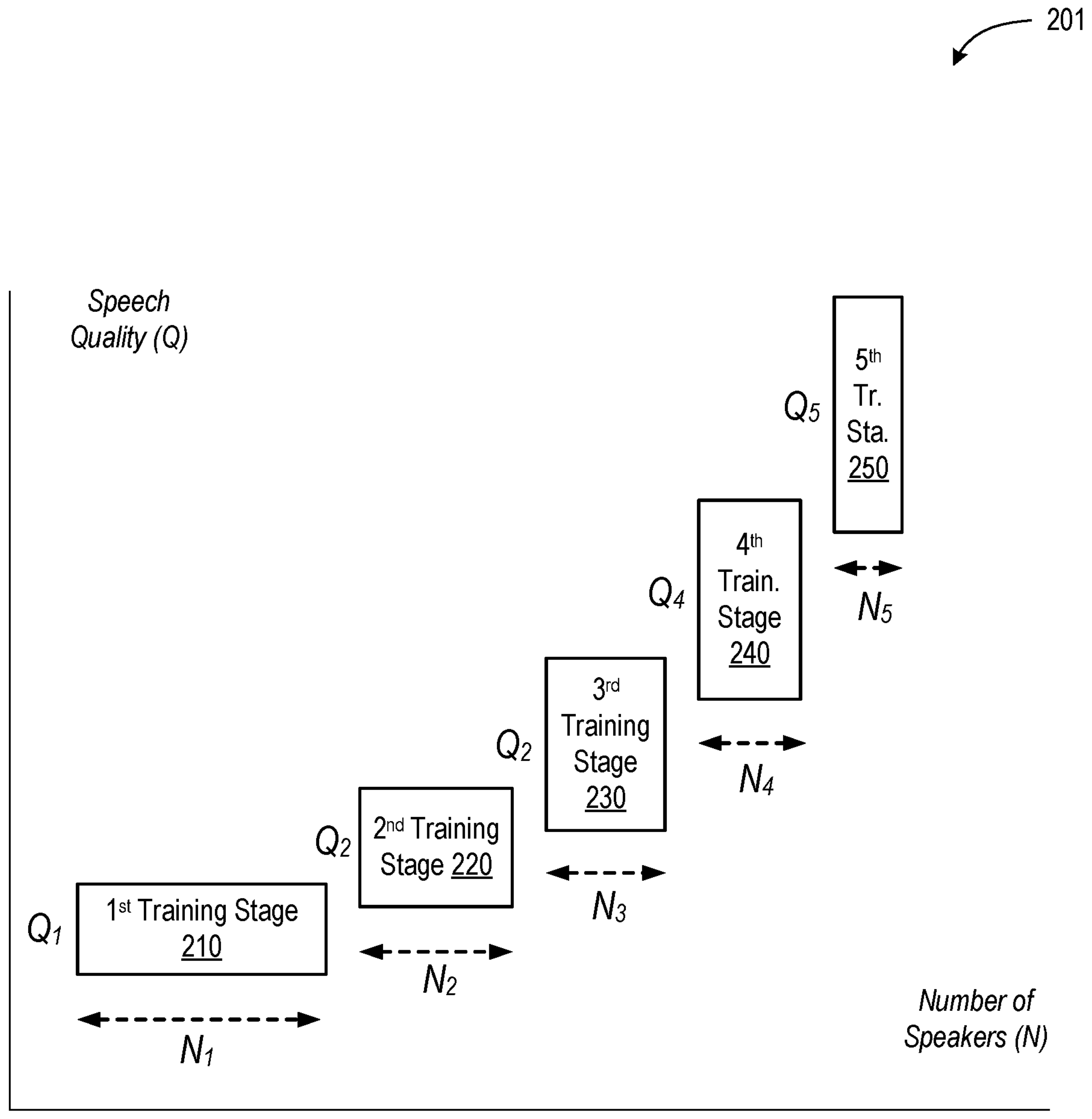
FIG. 2B illustrates schematically a sequence of multiple training stages for training TTS models, according to at least one embodiment.

It should be understood that the two-stage architecture of FIG. 2A for training of SM 120 is intended as an illustration and that the multi-stage funnel-type training may include any number of such training stages. FIG. 2B illustrates schematically a sequence 201 of multiple training stages for training TTS models, according to at least one embodiment. An example five-stage training is illustrated in FIG. 2B for the sake of concreteness. Each of the five training stages 210-250 is depicted via a rectangle whose width illustrates a number of different speakers $N_1 \ldots N_5$ in a corresponding database of speech utterances used by the respective training stage. A vertical extent of each training stage 210-250 illustrates quality of speech utterances used in the respective training stage. The bottom/top edge of each box illustrates schematically a minimum/maximum speech quality of an utterance used in the respective training stage and values $Q_1 \ldots Q_5$ denote average speech qualities (e.g., SNR values) of such utterances.

As illustrated in FIG. 2B, in some embodiments, the number of speakers may decrease with each subsequent training stage, $N_1>N_2>N_3>N_4>N_5$ (though this is not a requirement) while the average quality of speech utterances may increase, $Q_1<Q_2<Q_3<Q_4<Q_5$. In some embodiments, the quality of speech utterances may increase, but the number of speakers used in each consecutive training stage need not decrease, e.g., may remain constant or may even increase between any two stages. In some embodiments, at least some of the lower-quality speech utterances of the lower training stages may be obtained from higher-quality speech utterances by adding noise and/or other audio artifacts that reduce the audio quality of the respective utterances.

Figure 3:
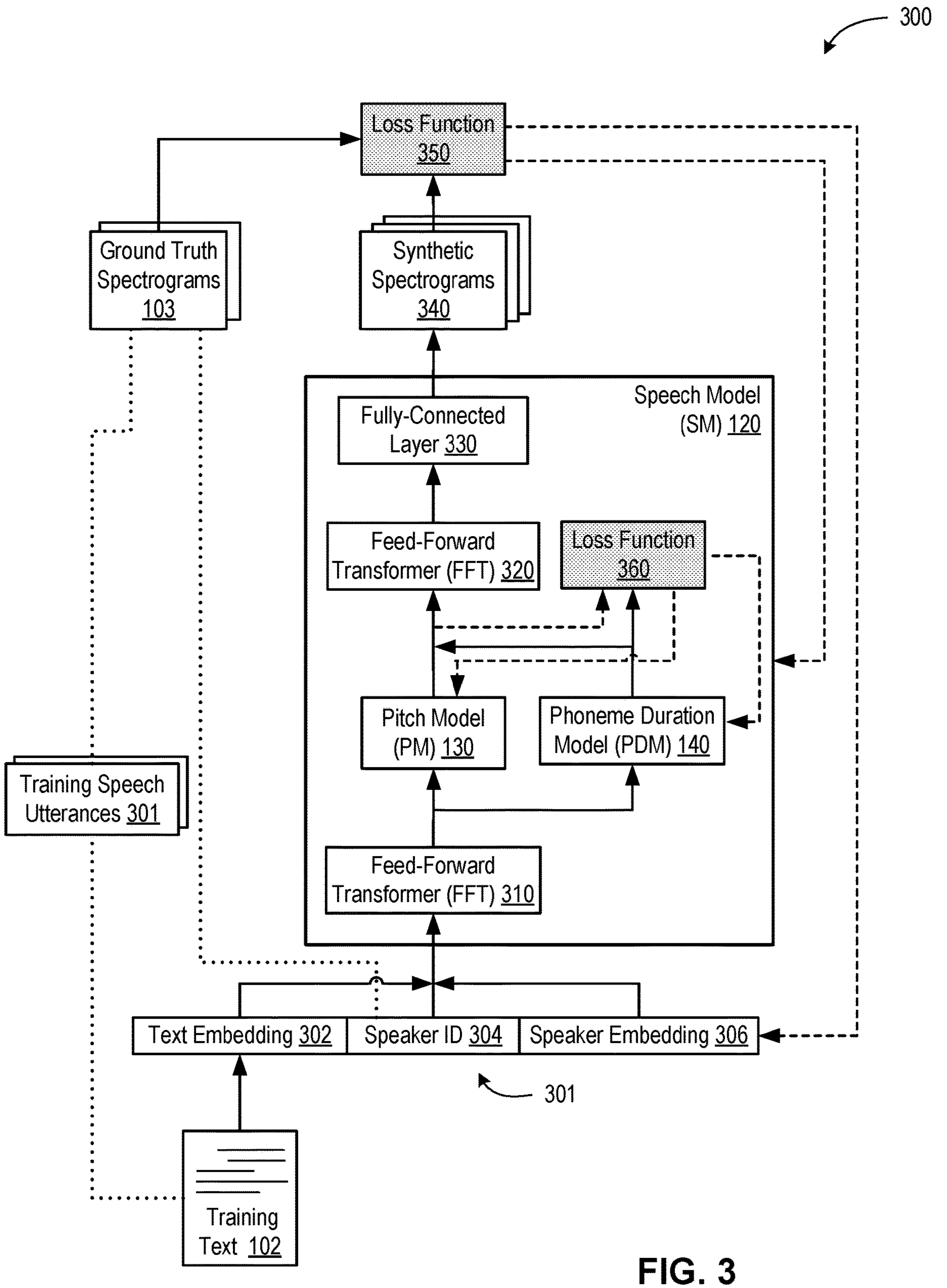
FIG. 3 illustrates example operations performed in the course of training of a speech model capable of generating synthetic speech based on speech attributes of multiple speakers, according to at least one embodiment.

FIG. 3 illustrates example operations 300 performed in the course of training of a speech model capable of generating outputs corresponding to synthetic speech based on speech attributes of multiple speakers, according to at least one embodiment. A model illustrated in FIG. 3 may be SM 120 described in conjunction with FIG. 1 and FIG. 2, or any other similar TTS model. It should be understood that the model architecture depicted in FIG. 3 is intended as an illustration and that numerous other models may be trained using the same or similar operations. In some embodiments, a training input 301 into SM 120 may include a text embedding 302, which may be any digital representation of a training text 102. For example, text embedding 302 may include a set of tokens, where individual tokens may encode specific alphanumeric symbols of training text 102, such as a letter, a number, a word, a sub-word, a symbol, a glyph, and so on, according to any language in which speech synthesis is being performed. Some of the tokens of text embedding 302 may encode spaces and punctuation marks of training text 102. Different text embeddings 302 may correspond to a particular number of symbols or words of training text. In some embodiments, different text embeddings 302 may correspond to a particular interval of a training speech utterance. Since individual training stages of the multi-stage training may include training speech utterances pronounced by multiple speakers, training input 301 may include a speaker identifier (ID) 304, which may be any label uniquely identifying a speaker who generates the respective training speech utterance associated with text embedding 302. During training, SM 120 learns how to associate various training speech utterances with correct speaker IDs 304.

Training input 301 may further include speaker embeddings 306 that encode speech features of various speakers in the training database(s). A speaker embedding encoding speech features of a particular speaker may be a digital string (vector) of a predetermined length M, e.g., a 128-bit vector, a 192-bit vector, a 256-bit vector, a 512-bit vector, and/or the like. In some embodiments, speaker embeddings 306 may be represented collectively as a suitable combination of individual speaker embeddings, e.g., as an N×M embeddings matrix with speaker IDs 304 enumerating various partitions (e.g., rows) of the embedding matrix associated with individual speakers. During training, SM 120 learns to use speaker IDs 304 to reference correct partitions of the embedding matrix.

At the start of training (or at the start of each individual training stage that uses a new set of speakers) speaker embeddings 306 may be unknown and may be seeded with some initial, e.g., random, values. In the course of training, a training engine, e.g., MSTE 114 of FIG. 1, modifies speaker embeddings 306 in a way that shapes each individual speaker embedding (e.g., a row of the embeddings matrix) to represent speech features of a particular speaker. SM 120 processes training input 301 and outputs synthetic spectrograms 340 that approximate speech and voice features of a speaker identified by speaker ID 304 pronouncing training text 102. SM 120 may have numerous possible architectures. By way of example and not limitation, SM 120 may include one or more feed-forward transformers (FFTs), e.g., FFT 310 and FFT 320. Each of the FFTs may have a stack of feed-forward layers with a transformer architecture having one or more multi-head attention blocks, several layers of one-dimensional (1D) convolutions, pooling and/or normalization layers, and/or other layers. The attention blocks facilitate association of various phonemes of the speech being generated with correct units (words, syllables, sounds, etc.) of text embedding 302.

Figure 4A:
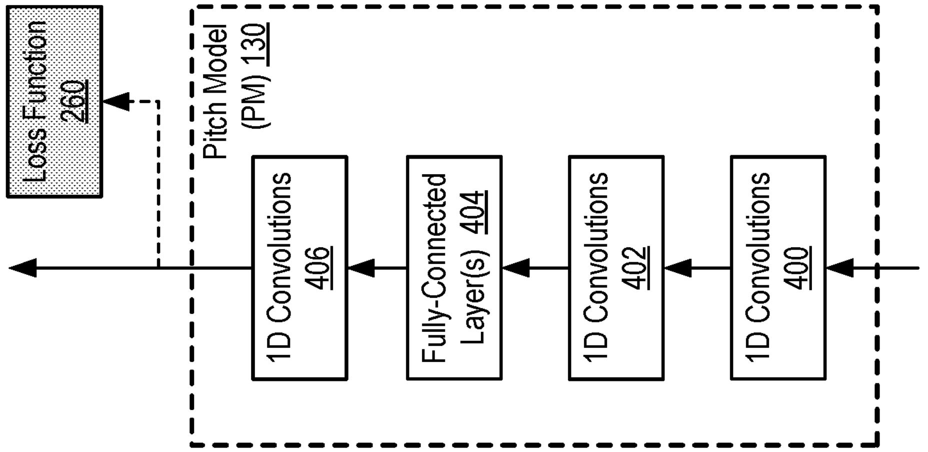
FIG. 4A illustrates example architecture of a pitch model configured to determine low-level characteristics of synthetic speech, according to at least one embodiment.
Figure 4B:
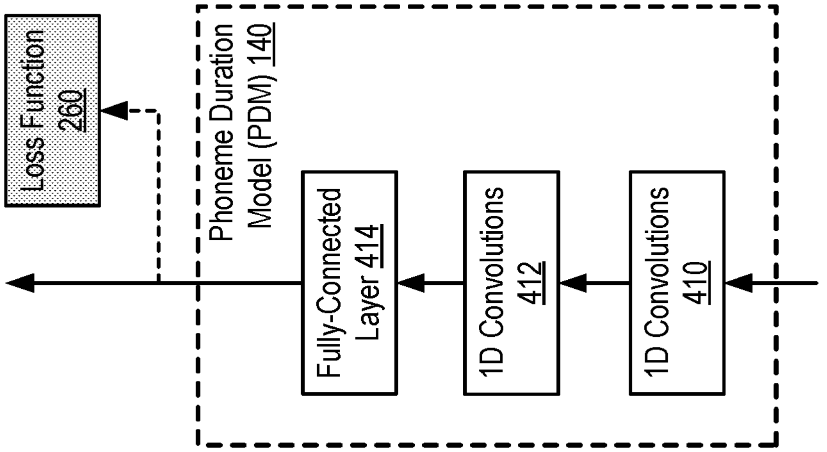
FIG. 4B illustrates an example architecture of a phoneme duration model configured to predict duration of pronunciation of various phonemes of synthetic speech, according to at least one embodiment.

An output of FFT 310 may be processed by PM 130 and PDM 140. In some embodiments, processing by PM 130 and PDM 140 may be performed in parallel. PM 130 may determine low-level speech characteristics for pronunciation of various phonemes of the synthetic speech. The low-level characteristics may include a fundamental frequency (pitch) used during pronunciation of the respective phoneme. In some embodiments, the low-level characteristics may further include energy (volume) of the synthetic speech for various phonemes. FIG. 4A illustrates example architecture of a pitch model 130 configured to determine low-level characteristics of synthetic speech, according to at least one embodiment. As illustrated, PM 130 may include multiple layers (or sets of layers) of 1D convolutions, e.g., layers 400, 402, and 406, as shown. PM 130 may further include one or more fully connected layers, e.g., layer(s) 404. With a continuing reference to FIG. 3, PDM 140 may determine correct durations for various phonemes of the synthetic speech. FIG. 4B illustrates an example architecture of a phoneme duration model 140 configured to predict the duration of pronunciation of various phonemes of synthetic speech, according to at least one embodiment. As illustrated, PDM 140 may include multiple layers (or sets of layers) of 1D convolutions, e.g., layers 410 and 412, and one or more fully connected layers, e.g., layer(s) 414.

With a continuing reference to FIG. 3, processing by PM 130 and PDM 140 may transform a hidden representation output by FFT 310 into a set of predicted pitch values, $\{p_j\}=p_1, p_2, \ldots, p_t$ and a corresponding set of durations $\{d_j\}=d_1, d_2, \ldots, d_t$. The outputs of PM 130 and PDM 140 may be jointly processed by FFT 320. One or more fully-connected layers 330 may then determine synthetic spectrograms 340, $\{f_j\}=f_1, f_2, \ldots, f_t$, for various time frames of synthetic speech. Synthetic spectrograms 340 may be compared with ground truth spectrograms 103 $\{f_j^{GT}\}=f_1^{GT}, f_2^{GT}, \ldots, f_t^{GT}$, using a suitable loss function 350. In some embodiments, the loss function may be the mean-squared error loss function, e.g., $$L=\sum_{j=1}^{t}\left(f_j-f_i^{GT}\right)^2.$$

As indicated by the dashed arrows in FIG. 3, the computed loss function 350 may be backpropagated through various layers and neurons of SM 120 and the parameters (weights and biases) of SM 120 may be adjusted to minimize (or reduce) the loss function. Likewise, the values of speaker embeddings 306 may be modified to further reduce the loss function 350. This teaches SM 120 to generate realistic speech spectrograms and simultaneously conditions speaker embeddings 306 to correctly approximate speech of the real speakers.

In some embodiments, additional losses associated with imprecise determination of pitch values and/or phoneme durations may be separately evaluated using loss function 360. A ground truth data for the loss function may include target pitch values $\{p_j^{GT}\}=p_1^{GT}, p_2^{GT}, \ldots, p_t^{GT}$ and target phoneme durations $\{d_j^{GT}\}=d_1^{GT}, d_2^{GT}, \ldots, d_t^{GT}$, which may be determined, e.g., from ground truth spectrograms 103. In some embodiments, loss function 360 may also be the mean-squared loss function, $$L'=\alpha\cdot\sum_{j=1}^{t}\left(p_j-p_i^{GT}\right)^2+\beta\cdot\sum_{j=1}^{t}\left(d_j-d_i^{GT}\right)^2$$

with some empirically determined weights α and β. In some embodiments, loss function 360 may be used (e.g., as illustrated with the corresponding dashed arrows in FIG. 3) to train PM 130 and/or PDM 140. In some embodiments, PM 130 and PDM 140 may be trained using separate loss functions, e.g., PM 130 may be trained using loss function $L_{PM}=\Sigma_{j=1}^{t}(p_j-p_i^{GT})^2$ and PDM 140 may be trained using loss function $L_{PDM}=\Sigma_{j=1}^{t}(d_j-d_i^{GT})^2$. In some embodiments, the loss function L 350 and loss function L' 360 may be joined into a combined loss function, e.g., L+L', and the combined loss function may be used to train various parts and subnetworks of SM 120 concurrently. Although the above examples uses the mean-squared error loss function as an illustrative example, in various embodiments other loss functions may be used, including (but not limited to) mean absolute error loss function, mean-squared logarithmic error loss function, Huber loss function, and/or any other loss functions, or a combination thereof.

Figure 5:
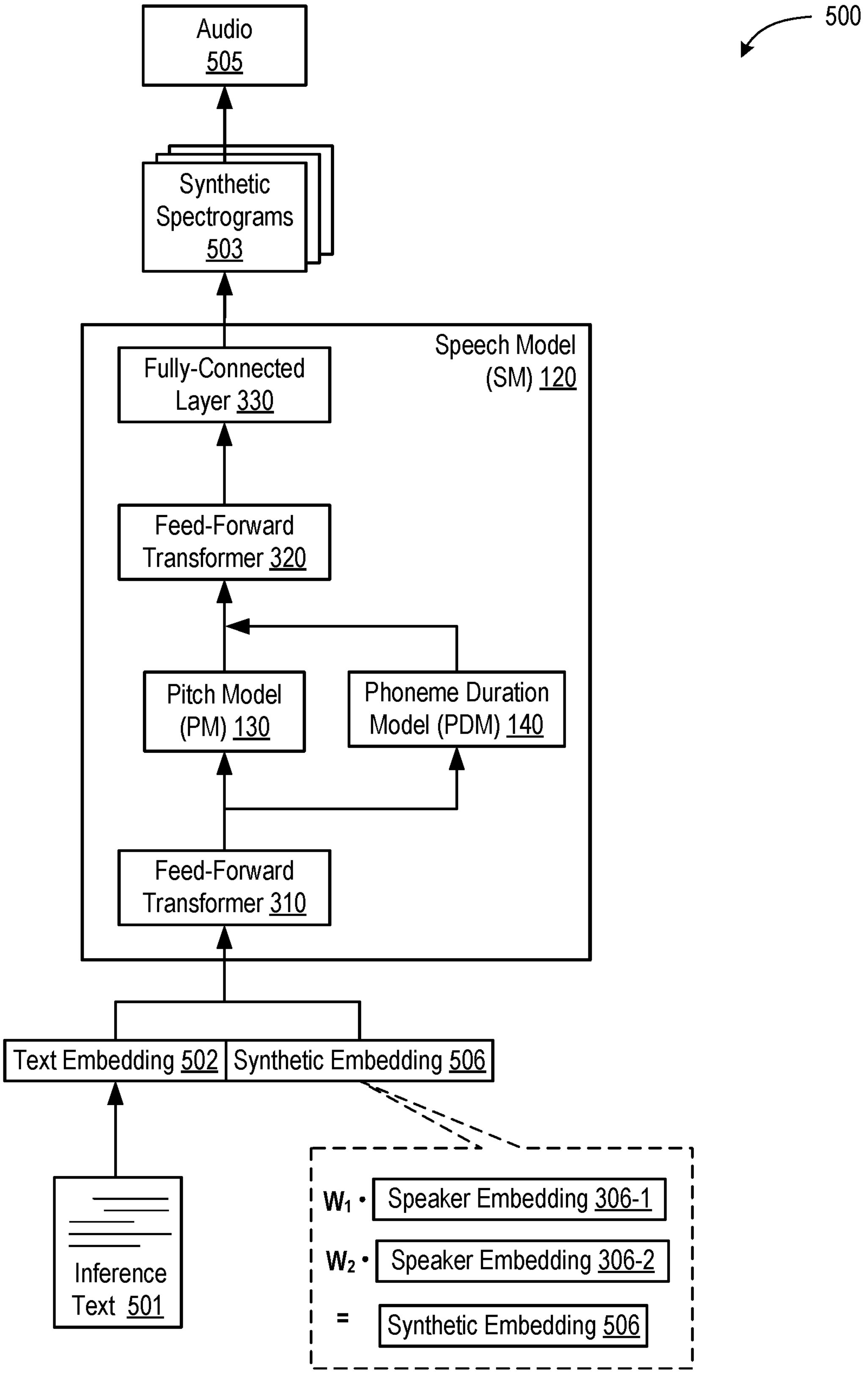
FIG. 5 illustrates example operations performed during inference by a trained speech model capable of generating synthetic speech based on speech attributes of multiple speakers, according to at least one embodiment.

FIG. 5 illustrates example operations 500 performed during inference by a trained speech model capable of generating outputs used for synthetic speech generation based on speech attributes of multiple speakers, according to at least one embodiment. In some embodiments, the model illustrated in FIG. 5 may be SM 120 trained as described above in conjunction with FIGS. 2A-2B and FIG. 3. Blocks and components of FIG. 5 that are denoted with the same numerals as used in FIGS. 1-4 may have the same or a similar functionality. In the course of operations 500, SM 120 may convert an inference text 501 into an audio 505 that includes a synthetic speech recording of pronunciation of inference text 501 by a synthetic speaker whose speech/voice features are interpolated using speech/voice features of speakers whose speech was used for training of SM 120.

More specifically, inference text 501 may be converted into one or more text embeddings 502, e.g., using the same digital token encoding scheme as used during training of SM 120. Text embedding(s) 502 may be used as an input into trained SM 120. Additionally, the input into trained SM 120 may include one or more synthetic embeddings 506 that encode speech features of a synthetic speaker. In some embodiments, individual synthetic embedding 506 may be obtained by selecting two or more speaker embeddings 306-1, 306-2, . . . , e.g., learned during training of SM 120, and computing a combination of the selected embeddings, e.g.

$$\text{Synthetic Embedding}=\Sigma_K W_K\cdot\text{Synthetic Embedding}_K$$

with some weights $W_K$ (an example combination of two weighted speaker embeddings 306-1 and 306-2 is illustrated schematically in FIG. 5). In some embodiments, weights $W_K$ may be selected randomly. In some embodiments, the generated synthetic embedding 506 may be subject to additional conditions. For example, a norm Norm of synthetic embedding 506 may be computed and compared with a target interval $[\text{Norm}_{MIN}, \text{Norm}_{MAX}]$, with empirically determined lower bound $\text{Norm}_{MIN}$ and upper bound $\text{Norm}_{MAX}$. If the computed Norm is within the target interval, the corresponding synthetic embedding 506 may be used for synthetic speech generation. If the computed Norm is outside the target interval, the corresponding synthetic embedding 506 may be discarded and a new synthetic embedding 506 may be generated. In some embodiments, weights $W_K$ may be scalar numbers. In some embodiments, weights $W_K$ may be matrices, e.g., D×D matrices, where D is a dimension of speaker embeddings.

The inference input into SM 120 may further include text embedding 502 (or a batch of such text embeddings, when long utterances are being generated), e.g., concatenated (or otherwise combined) with synthetic embedding 506, in some embodiments. SM 120 may process the inference input substantially as described herein at least in conjunction with FIG. 3 and FIG. 4. The output of SM 120 may include a set of synthetic spectrograms 503, $\{f_j\}=f_1, f_2, \ldots, f_t$, which may include different spectrograms corresponding to various time frames of the synthetic speech. The output synthetic spectrograms 503 may then be used to generate output audio 505 (e.g., a waveform) for a synthetic speaker whose speech/voice features are determined using the synthetic embedding 506. Output audio 505 may be in any suitable digital format, e.g., WAV, AIFF, MP3, AAC, OGG, WMA, FLAC, ALAC, and so on.

Figure 6A:
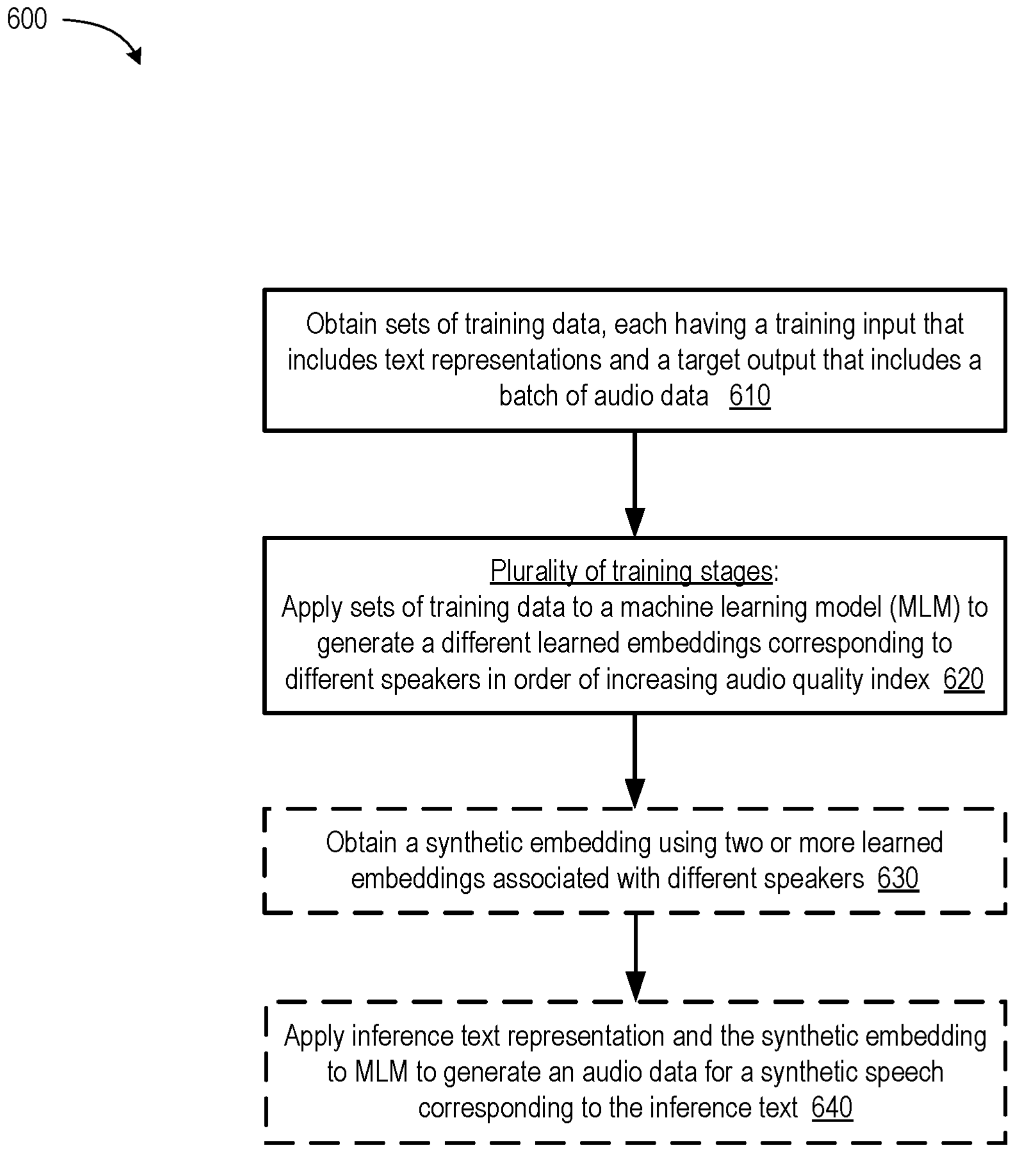
FIGS. 6A-6B are flow diagrams illustrating a method of training and deploying of a speech model capable of generating synthetic speech based on speech attributes of multiple speakers, according to some embodiments of the present disclosure.
Figure 6B:
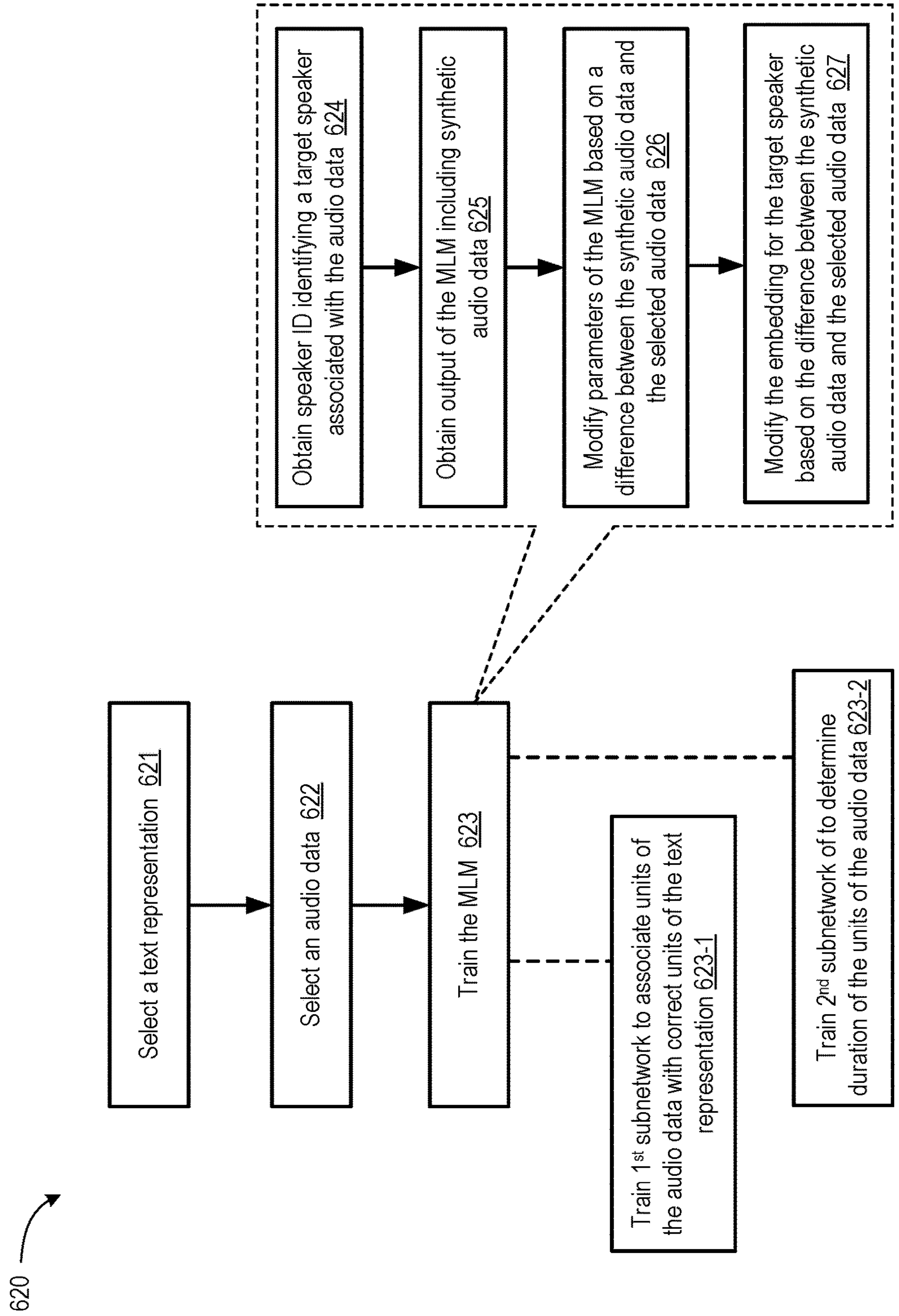

FIGS. 6A-6B are flow diagrams illustrating method 600 for training and deployment of a speech model capable of generating outputs corresponding to synthetic speech determined based on speech attributes of multiple speakers, according to some embodiments of the present disclosure. Method 600 may be performed using one or more processing units (e.g., CPUs, GPUs, accelerators, PPUs, DPUs, etc.), which may include (or communicate with) one or more memory devices. In at least one embodiment, method 600 may be performed using processing units of computing device 110 and/or synthesis server 150. In at least one embodiment, processing units performing method 600 may be executing instructions stored on a non-transient computer-readable storage media. In at least one embodiment, method 600 may be performed using multiple processing threads (e.g., CPU threads and/or GPU threads), individual threads executing one or more individual functions, routines, subroutines, or operations of the method. In at least one embodiment, processing threads implementing method 600 may be synchronized (e.g., using semaphores, critical sections, and/or other thread synchronization mechanisms). Alternatively, processing threads implementing method 600 may be executed asynchronously with respect to each other. Various operations of method 600 may be performed in a different order compared with the order shown in FIGS. 6A-6B. Some operations of method 600 may be performed concurrently with other operations. In at least one embodiment, one or more operations shown in FIG. 6 may not always be performed.

Method 600 may be performed in the context of text-to-speech translations. Method 600 may involve speech utterances produced by people in any possible context, e.g., a conversation, a public speech, a public event, a business meeting, a conference, a street encounter, an interaction in a game, an interaction with a chat bot or digital avatar, an interaction with an in-vehicle infotainment system, and/or the like. "Speech," as used in the context of method 600 should be understood as including sounds of non-human origins, e.g., sounds of animals. "Speech," as used in the context of method 600 should also be understood as including sounds produced by non-living entities, including natural forces, such as wind, sea, ocean, thunderstorms, and various other atmospheric or naval phenomena, as well as robots, synthesized or computer-generated speech, etc. "Speech," as used in the context of method 600 should further be understood as including artificial sounds, such as sounds of vehicles, industrial equipment, and so on. Similarly, a "speaker" should be understood as any entity (real or virtual) that generates speech.

As illustrated in FIG. 6A, at block 610, one or more processing units executing method 600 may obtain a plurality of sets of training data. Individual sets of the plurality of sets of training data may include a training input that includes a batch of text representations. Each individual set may further include a target output that includes a batch of audio data. The audio data may include speech spectrograms, e.g., mel-spectrograms, and/or other digital representation of a speech. In some embodiments, individual sets of the plurality of sets of training data are associated with a different audio quality (AQ) index characterizing audio quality of a corresponding batch of the audio data.

At block 620, method 600 may include training a machine learning model (MLM) using a plurality of training stages. Each training stage may include applying a respective set of training data of the plurality of sets of training data to the MLM to generate a different learned embedding corresponding to different speakers associated with the respective set of training data. In some embodiments, the plurality of training stages may be performed in an order of increasing quality of speech (e.g., in the order of increasing AQ index). In some embodiments, the plurality of training stage may also be performed in an order of decreasing number of speakers associated with the respective set of the training data, e.g., a first training stage may be performed using a first plurality of training utterances associated with a first plurality of speakers and a second training stage may be performed using a second plurality of training utterances associated with a second plurality of speakers, and the number of the first plurality of speakers may be larger than the number of the second plurality of speakers. In some embodiments, the MLM may include at least one transformer neural subnetwork having one or more attention layers.

In some embodiments, performing the plurality of training stages of block 620 may include a number of operations illustrated in FIG. 6B. More specifically, at block 621, method 600 may include selecting a text representation (e.g., text embedding 302 representing training text 102 in FIG. 3). The text representation may be selected from the batch of text representations of the training input for a corresponding training stage of the one or more training stages. At block 622, method 600 may include selecting audio data (e.g., synthetic spectrograms 340 in FIG. 3). The audio data may be selected from the batch of audio data of the target output for the corresponding training stage. At block 623, the text representation and the audio data may be used to train the MLM. As indicated schematically with block 623-1, training the MLM may include training a first subnetwork (e.g., pitch model 130 in FIG. 3) to associate units of the selected audio data (e.g., frames, spectrograms, etc.) with correct units (e.g., phonemes) of the selected text representation. As indicated schematically with block 623-2, training the MLM may further include training a second subnetwork (e.g., phoneme duration model 140 in FIG. 3) to determine duration of the units of the selected audio data. Each of the first subnetwork and the second subnetwork may include one or more convolutional layers of neurons and/or one or more fully connected layers of neurons (e.g., as illustrated in FIGS. 4A-B).

One or more of the plurality of training stages may include operations of the callout portion of FIG. 6B. More specifically, at block 624, the one or more processing units performing method 600 may obtain a target speaker identification (e.g., speaker ID 304 in FIG. 3). Target speaker ID may identify a target speaker associated with the selected audio data (e.g., the ground truth speaker). At block 625, method 600 may continue with applying, to the MLM, the selected text representation (e.g., text embedding 302 in FIG. 3), the target speaker ID (e.g., speaker ID 304 in FIG. 3), and/or an embedding for the target speaker (e.g., speaker embedding 306 in FIG. 3), and obtaining an output of the MLM. The output of the MLM may include synthetic audio data generated by processing the input that includes the selected text representation, the target speaker ID, and the embedding for the target speaker. In some embodiments, the input into the MLM may include a combination (e.g., a concatenation) of the text representation, the target speaker ID, and/or the embedding for the target speaker.

At block 626, method 600 may include modifying/updating/adjusting parameters of the MLM based on a difference between the synthetic audio data (e.g., synthetic spectrograms 340) and the selected audio data (e.g., the ground truth spectrograms for the target speaker). At block 627, method 600 may include modifying the embedding for the target speaker based on a difference between the synthetic audio data and the selected audio data.

With a continuing reference to FIG. 6A, deployment of the trained MLM may include operations depicted with dashed blocks. It should be understood that the inference (deployment) stage of the MLM (dashed boxes in FIG. 6A) may be performed using a different server or computing device than the server/device used during the training stage (solid boxes in FIGS. 6A-B). In some embodiments, at block 630, the inference stage may include obtaining a synthetic embedding (e.g., synthetic embedding 506 in FIG. 5) using two or more learned embeddings associated with different speakers (e.g., speaker embeddings 306-1, 306-2, etc., in FIG. 5). At least one of the two or more learned embeddings may be generated in the course of the multi-stage training of the MLM (e.g., as illustrated in FIG. 6). In some embodiments, the synthetic embedding may be obtained by computing a weighted combination of the two or more learned embeddings. In some embodiments, weights in the weighted combination of the two or more learned embeddings (e.g., weights $W_1$, $W_2$, etc.) may be selected randomly. At block 640, method 600 may apply a text representation (e.g., text embedding 502 representing inference text 501 in FIG. 5) and the synthetic embedding to the MLM to generate an audio data for a synthetic speech (e.g., one or more synthetic spectrograms 503 in FIG. 5) corresponding to the text representation.

The systems and methods described herein may be used for a variety of purposes, by way of example and without limitation, for performing one or more operations corresponding to a system that performs machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., an in-vehicle infotainment system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Inference and Training Logic

Figure 7A:
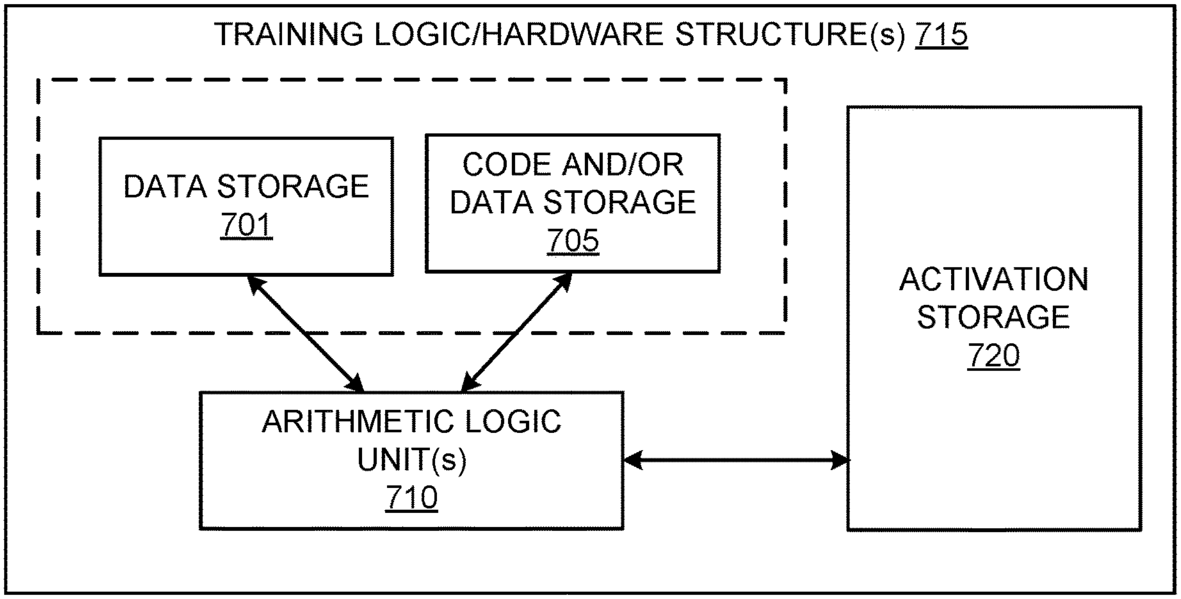
FIG. 7A illustrates inference and/or training logic, according to at least one embodiment.

FIG. 7A illustrates inference and/or training logic 715 used to perform inferencing and/or training operations associated with one or more embodiments.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs) or simply circuits). In at least one embodiment, code, such as graph code, loads weight or other parameter information into processor ALUs based on an architecture of a neural network to which such code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 701 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes the loading of weight or other parameter information into processor ALUs based on an architecture of a neural network to which such code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to one or more processors or other hardware logic devices or circuits. In at least one embodiment, code and/or data storage 705 may be cache memory, DRAM, SRAM, non-volatile memory (e.g., flash memory), or other storage. In at least one embodiment, a choice of whether code and/or data storage 705 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be a combined storage structure. In at least one embodiment, code and/or data storage 701 and code and/or data storage 705 may be partially combined and partially separate. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., flash memory), or other storage. In at least one embodiment, activation storage 720 may be completely or partially within or external to one or more processors or other logical circuits. In at least one embodiment, a choice of whether activation storage 720 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 illustrated in FIG. 7A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
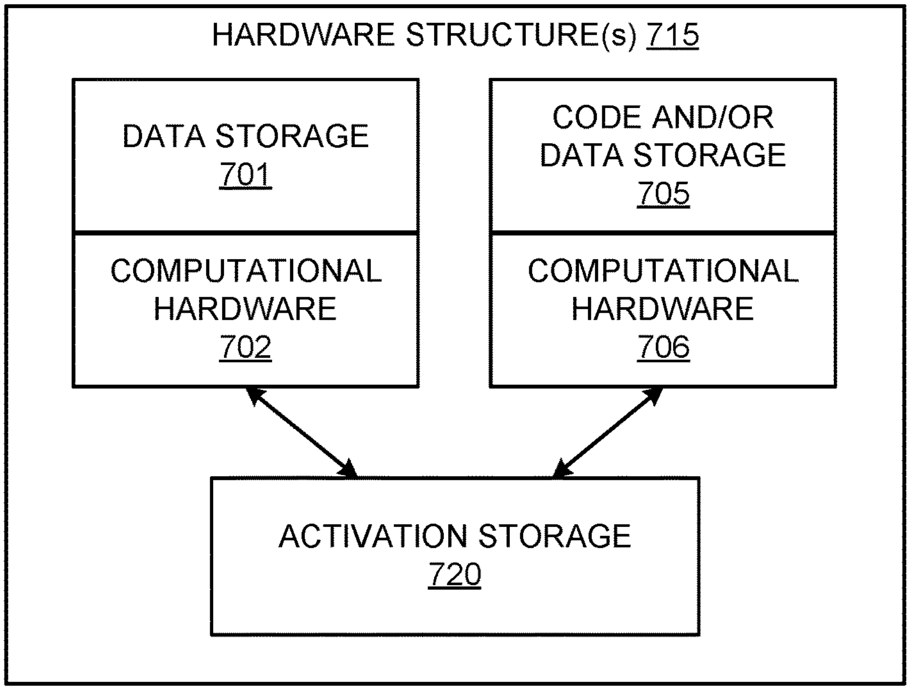
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one storage/computational pair 701/702 of code and/or data storage 701 and computational hardware 702 is provided as an input to a next storage/computational pair 705/706 of code and/or data storage 705 and computational hardware 706, in order to mirror a conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage/computation pairs 701/702 and 705/706 may be included in inference and/or training logic 715.

Neural Network Training and Deployment

Figure 8:
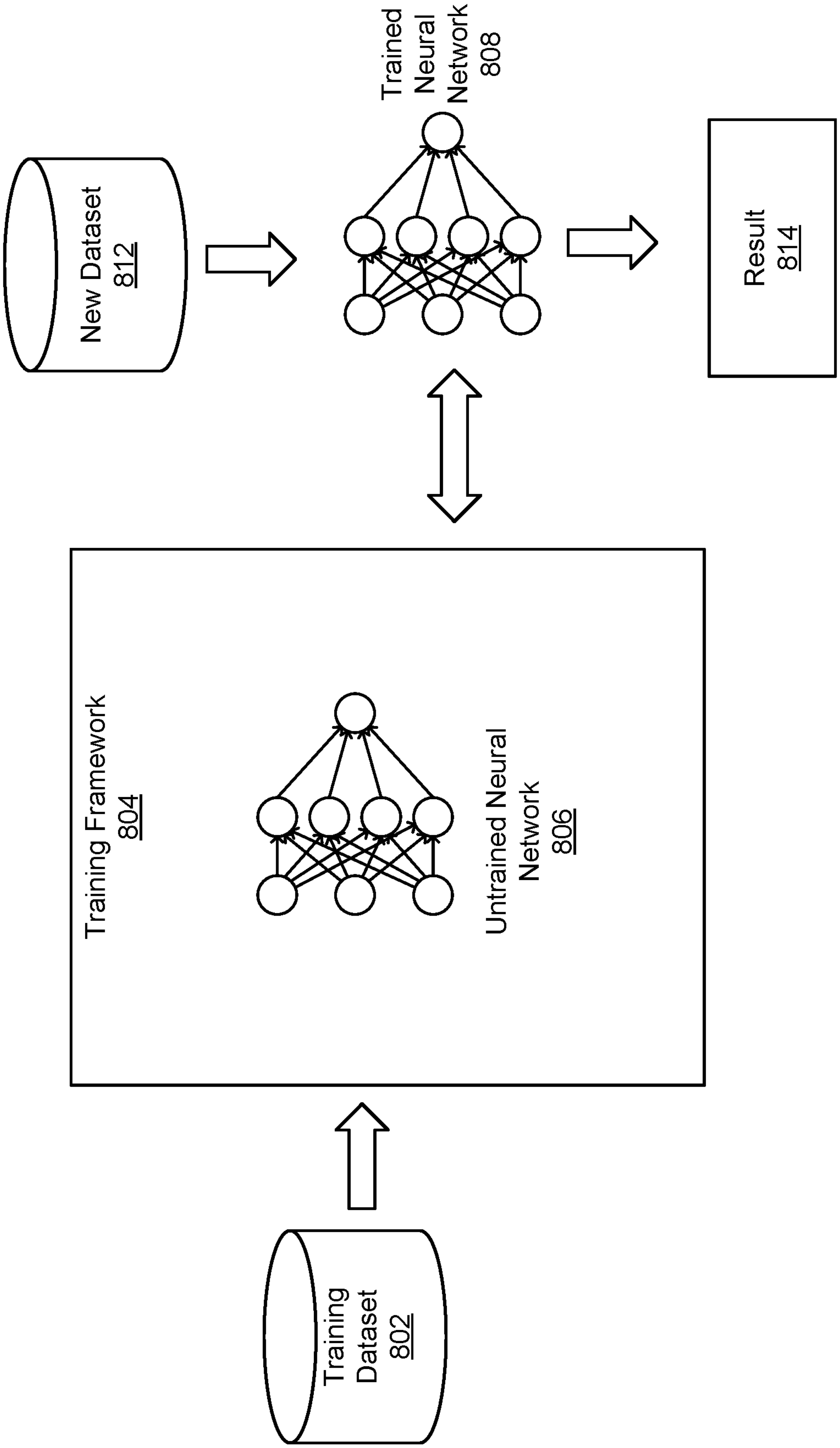
FIG. 8 illustrates training and deployment of a neural network, according to at least one embodiment.

FIG. 8 illustrates training and deployment of a deep neural network, according to at least one embodiment. In at least one embodiment, untrained neural network 806 is trained using a training dataset 802. In at least one embodiment, training framework 804 is a PyTorch framework, whereas in other embodiments, training framework 804 is a TensorFlow, Boost, Caffe, Microsoft Cognitive Toolkit/CNTK, MXNet, Chainer, Keras, Deeplearning4j, or other training framework. In at least one embodiment, training framework 804 trains an untrained neural network 806 and enables it to be trained using processing resources described herein to generate a trained neural network 808. In at least one embodiment, weights may be chosen randomly or by pre-training using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having a known output and an output of neural network 806 is manually graded. In at least one embodiment, untrained neural network 806 is trained in a supervised manner and processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on input data such as a new dataset 812. In at least one embodiment, training framework 804 trains untrained neural network 806 repeatedly while adjusting weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 can then be deployed to implement any number of machine learning operations.

In at least one embodiment, untrained neural network 806 is trained using unsupervised learning, whereas untrained neural network 806 attempts to train itself using unlabeled data. In at least one embodiment, unsupervised learning training dataset 802 will include input data without any associated output data or "ground truth" data. In at least one embodiment, untrained neural network 806 can learn groupings within training dataset 802 and can determine how individual inputs are related to untrained dataset 802. In at least one embodiment, unsupervised training can be used to generate a self-organizing map in trained neural network 808 capable of performing operations useful in reducing dimensionality of new dataset 812. In at least one embodiment, unsupervised training can also be used to perform anomaly detection, which allows identification of data points in new dataset 812 that deviate from normal patterns of new dataset 812.

In at least one embodiment, semi-supervised learning may be used, which is a technique in which in training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new dataset 812 without forgetting knowledge instilled within trained neural network 808 during initial training.

Figure 9:
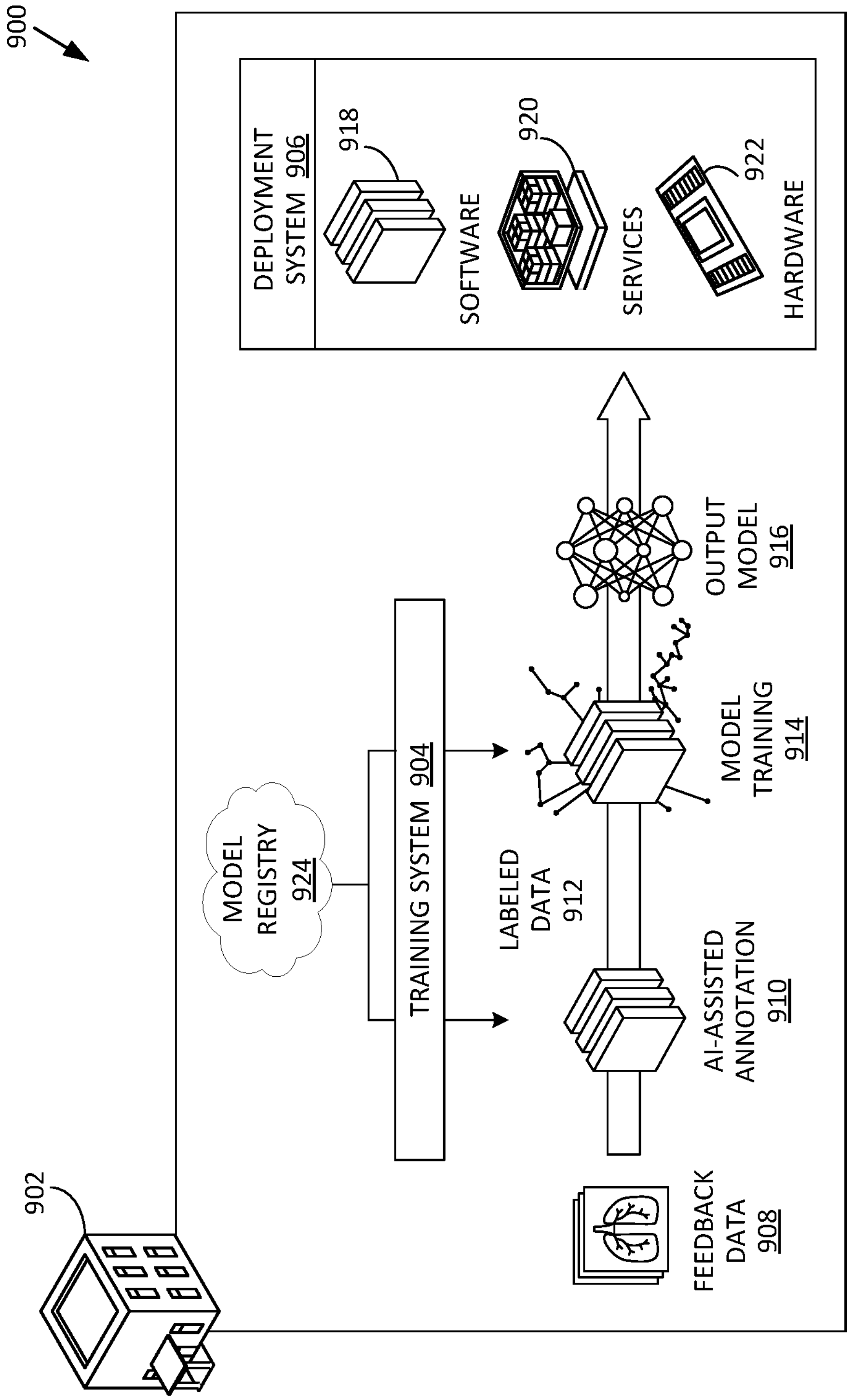
FIG. 9 is an example data flow diagram for an advanced computing pipeline, according to at least one embodiment.

With reference to FIG. 9, FIG. 9 is an example data flow diagram for a process 900 of generating and deploying a processing and inferencing pipeline, according to at least one embodiment. In at least one embodiment, process 900 may be deployed to perform game name recognition analysis and inferencing on user feedback data at one or more facilities 902, such as a data center.

In at least one embodiment, process 900 may be executed within a training system 904 and/or a deployment system 906. In at least one embodiment, training system 904 may be used to perform training, deployment, and embodiment of machine learning models (e.g., neural networks, object detection algorithms, computer vision algorithms, etc.) for use in deployment system 906. In at least one embodiment, deployment system 906 may be configured to offload processing and compute resources among a distributed computing environment to reduce infrastructure requirements at facility 902. In at least one embodiment, deployment system 906 may provide a streamlined platform for selecting, customizing, and implementing virtual instruments for use with computing devices at facility 902. In at least one embodiment, virtual instruments may include software-defined applications for performing one or more processing operations with respect to feedback data. In at least one embodiment, one or more applications in a pipeline may use or call upon services (e.g., inference, visualization, compute, AI, etc.) of deployment system 906 during execution of applications.

In at least one embodiment, some applications used in advanced processing and inferencing pipelines may use machine learning models or other AI to perform one or more processing steps. In at least one embodiment, machine learning models may be trained at facility 902 using feedback data 908 (such as imaging data) stored at facility 902 or feedback data 908 from another facility or facilities, or a combination thereof. In at least one embodiment, training system 904 may be used to provide applications, services, and/or other resources for generating working, deployable machine learning models for deployment system 906.

In at least one embodiment, a model registry 924 may be backed by object storage that may support versioning and object metadata. In at least one embodiment, object storage may be accessible through, for example, a cloud storage (e.g., a cloud 1026 of FIG. 10) compatible application programming interface (API) from within a cloud platform. In at least one embodiment, machine learning models within model registry 924 may be uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 1004 (FIG. 10) may include a scenario where facility 902 is training their own machine learning model, or has an existing machine learning model that needs to be optimized or updated. In at least one embodiment, feedback data 908 may be received from various channels, such as forums, web forms, or the like. In at least one embodiment, once feedback data 908 is received, AI-assisted annotation 910 may be used to aid in generating annotations corresponding to feedback data 908 to be used as ground truth data for a machine learning model. In at least one embodiment, AI-assisted annotation 910 may include one or more machine learning models (e.g., convolutional neural networks (CNNs)) that may be trained to generate annotations corresponding to certain types of feedback data 908 (e.g., from certain devices) and/or certain types of anomalies in feedback data 908. In at least one embodiment, AI-assisted annotations 910 may then be used directly, or may be adjusted or fine-tuned using an annotation tool, to generate ground truth data. In at least one embodiment, in some examples, labeled data 912 may be used as ground truth data for training a machine learning model. In at least one embodiment, AI-assisted annotations 910, labeled data 912, or a combination thereof may be used as ground truth data for training a machine learning model, e.g., via model training 914 in FIGS. 9-10. In at least one embodiment, a trained machine learning model may be referred to as an output model 916, and may be used by deployment system 906, as described herein.

In at least one embodiment, training pipeline 1004 (FIG. 10) may include a scenario where facility 902 needs a machine learning model for use in performing one or more processing tasks for one or more applications in deployment system 906, but facility 902 may not currently have such a machine learning model (or may not have a model that is optimized, efficient, or effective for such purposes). In at least one embodiment, an existing machine learning model may be selected from model registry 924. In at least one embodiment, model registry 924 may include machine learning models trained to perform a variety of different inference tasks on imaging data. In at least one embodiment, machine learning models in model registry 924 may have been trained on imaging data from different facilities than facility 902 (e.g., facilities that are remotely located). In at least one embodiment, machine learning models may have been trained on imaging data from one location, two locations, or any number of locations. In at least one embodiment, when being trained on imaging data, which may be a form of feedback data 908, from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 924. In at least one embodiment, a machine learning model may then be retrained, or updated, at any number of other facilities, and a retrained or updated model may be made available in model registry 924. In at least one embodiment, a machine learning model may then be selected from model registry 924—and referred to as output model 916—and may be used in deployment system 906 to perform one or more processing tasks for one or more applications of a deployment system.

In at least one embodiment, training pipeline 1004 (FIG. 10) may be used in a scenario that includes facility 902 requiring a machine learning model for use in performing one or more processing tasks for one or more applications in deployment system 906, but facility 902 may not currently have such a machine learning model (or may not have a model that is optimized, efficient, or effective for such purposes). In at least one embodiment, a machine learning model selected from model registry 924 might not be fine-tuned or optimized for feedback data 908 generated at facility 902 because of differences in populations, genetic variations, robustness of training data used to train a machine learning model, diversity in anomalies of training data, and/or other issues with training data. In at least one embodiment, AI-assisted annotation 910 may be used to aid in generating annotations corresponding to feedback data 908 to be used as ground truth data for retraining or updating a machine learning model. In at least one embodiment, labeled data 912 may be used as ground truth data for training a machine learning model. In at least one embodiment, retraining or updating a machine learning model may be referred to as model training 914. In at least one embodiment, model training 914—e.g., AI-assisted annotations 910, labeled data 912, or a combination thereof—may be used as ground truth data for retraining or updating a machine learning model.

In at least one embodiment, deployment system 906 may include software 918, services 920, hardware 922, and/or other components, features, and functionality. In at least one embodiment, deployment system 906 may include a software "stack," such that software 918 may be built on top of services 920 and may use services 920 to perform some or all of processing tasks, and services 920 and software 918 may be built on top of hardware 922 and use hardware 922 to execute processing, storage, and/or other compute tasks of deployment system 906.

In at least one embodiment, software 918 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of computing device there may be any number of containers that may perform a data processing task with respect to feedback data 908 (or other data types, such as those described herein). In at least one embodiment, an advanced processing and inferencing pipeline may be defined based on selections of different containers that are desired or required for processing feedback data 908, in addition to containers that receive and configure imaging data for use by each container and/or for use by facility 902 after processing through a pipeline (e.g., to convert outputs back to a usable data type for storage and display at facility 902). In at least one embodiment, a combination of containers within software 918 (e.g., that make up a pipeline) may be referred to as a virtual instrument (as described in more detail herein), and a virtual instrument may leverage services 920 and hardware 922 to execute some or all processing tasks of applications instantiated in containers.

In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 916 of training system 904.

In at least one embodiment, tasks of data processing pipeline may be encapsulated in one or more container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 924 and associated with one or more applications. In at least one embodiment, images of applications (e.g., container images) may be available in a container registry, and once selected by a user from a container registry for deployment in a pipeline, an image may be used to generate a container for an instantiation of an application for use by a user system.

In at least one embodiment, developers may develop, publish, and store applications (e.g., as containers) for performing processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 920 as a system (e.g., system 1000 of FIG. 10). In at least one embodiment, once validated by system 1000 (e.g., for accuracy, etc.), an application may be available in a container registry for selection and/or embodiment by a user (e.g., a hospital, clinic, lab, healthcare provider, etc.) to perform one or more processing tasks with respect to data at a facility (e.g., a second facility) of a user.

Figure 10:
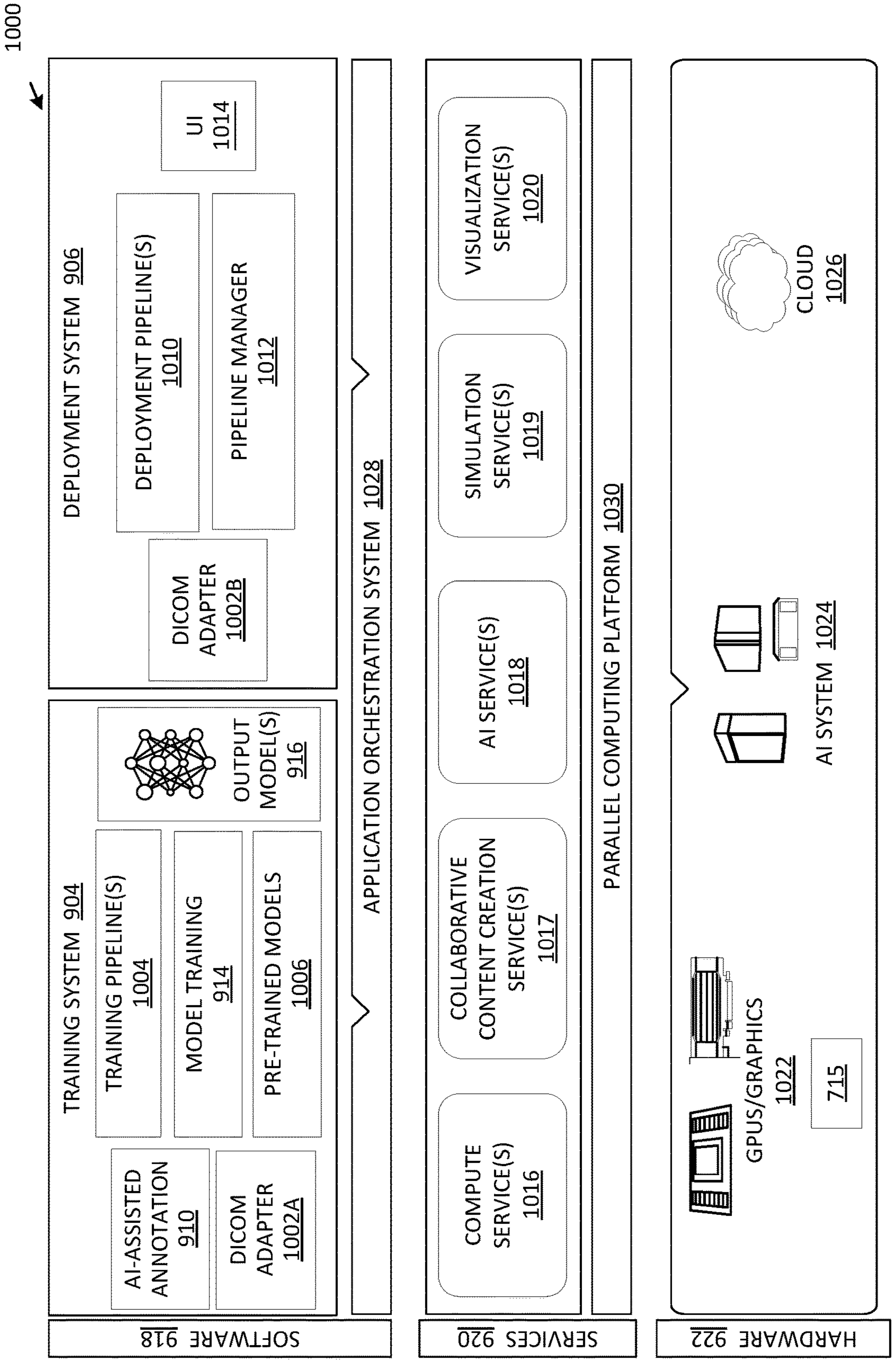
FIG. 10 is a system diagram for an example system for training, adapting, instantiating and deploying machine learning models in an advanced computing pipeline, according to at least one embodiment.

In at least one embodiment, developers may then share applications or containers through a network for access and use by users of a system (e.g., system 1000 of FIG. 10). In at least one embodiment, completed and validated applications or containers may be stored in a container registry and associated machine learning models may be stored in model registry 924. In at least one embodiment, a requesting entity that provides an inference or image processing request may browse a container registry and/or model registry 924 for an application, container, dataset, machine learning model, etc., select a desired combination of elements for inclusion in data processing pipeline, and submit a processing request. In at least one embodiment, a request may include input data that is necessary to perform a request, and/or may include a selection of application(s) and/or machine learning models to be executed in processing a request. In at least one embodiment, a request may then be passed to one or more components of deployment system 906 (e.g., a cloud) to perform processing of a data processing pipeline. In at least one embodiment, processing by deployment system 906 may include referencing selected elements (e.g., applications, containers, models, etc.) from a container registry and/or model registry 924. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 920 may be leveraged. In at least one embodiment, services 920 may include compute services, collaborative content creation services, simulation services, artificial intelligence (AI) services, visualization services, and/or other service types. In at least one embodiment, services 920 may provide functionality that is common to one or more applications in software 918, so functionality may be abstracted to a service that may be called upon or leveraged by applications. In at least one embodiment, functionality provided by services 920 may run dynamically and more efficiently, while also scaling well by allowing applications to process data in parallel, e.g., using a parallel computing platform 1030 (FIG. 10). In at least one embodiment, rather than each application that shares a same functionality offered by a service 920 being required to have a respective instance of service 920, service 920 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities.

In at least one embodiment, where a service 920 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 918 implementing advanced processing and inferencing pipeline may be streamlined because each application may call upon the same inference service to perform one or more inferencing tasks.

In at least one embodiment, hardware 922 may include GPUs, CPUs, graphics cards, an AI/deep learning system (e.g., an AI supercomputer, such as NVIDIA's DGX™ supercomputer system), a cloud platform, or a combination thereof. In at least one embodiment, different types of hardware 922 may be used to provide efficient, purpose-built support for software 918 and services 920 in deployment system 906. In at least one embodiment, use of GPU processing may be implemented for processing locally (e.g., at facility 902), within an AI/deep learning system, in a cloud system, and/or in other processing components of deployment system 906 to improve efficiency, accuracy, and efficacy of game name recognition.

In at least one embodiment, software 918 and/or services 920 may be optimized for GPU processing with respect to deep learning, machine learning, and/or high-performance computing, simulation, and visual computing, as non-limiting examples. In at least one embodiment, at least some of the computing environment of deployment system 906 and/or training system 904 may be executed in a datacenter or one or more supercomputers or high performance computing systems, with GPU-optimized software (e.g., hardware and software combination of NVIDIA's DGX™ system). In at least one embodiment, hardware 922 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC™) may be executed using an AI/deep learning supercomputer(s) and/or GPU-optimized software (e.g., as provided on NVIDIA's DGX™ systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 10 is a system diagram for an example system 1000 for generating and deploying a deployment pipeline, according to at least one embodiment. In at least one embodiment, system 1000 may be used to implement process 900 of FIG. 9 and/or other processes including advanced processing and inferencing pipelines. In at least one embodiment, system 1000 may include training system 904 and deployment system 906. In at least one embodiment, training system 904 and deployment system 906 may be implemented using software 918, services 920, and/or hardware 922, as described herein.

In at least one embodiment, system 1000 (e.g., training system 904 and/or deployment system 906) may be implemented in a cloud computing environment (e.g., using cloud 1026). In at least one embodiment, system 1000 may be implemented locally with respect to a facility, or as a combination of both cloud and local computing resources. In at least one embodiment, access to APIs in cloud 1026 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1000, may be restricted to a set of public internet service providers (ISPs) that have been vetted or authorized for interaction.

In at least one embodiment, various components of system 1000 may communicate between and among one another using any of a variety of different network types, including but not limited to local area networks (LANs) and/or wide area networks (WANs) via wired and/or wireless communication protocols. In at least one embodiment, communication between facilities and components of system 1000 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 904 may execute training pipelines 1004, similar to those described herein with respect to FIG. 9. In at least one embodiment, where one or more machine learning models are to be used in deployment pipelines 1010 by deployment system 906, training pipelines 1004 may be used to train or retrain one or more (e.g., pre-trained) models, and/or implement one or more of pre-trained models 1006 (e.g., without a need for retraining or updating). In at least one embodiment, as a result of training pipelines 1004, output model(s) 916 may be generated. In at least one embodiment, training pipelines 1004 may include any number of processing steps, AI-assisted annotation 910, labeling or annotating of feedback data 908 to generate labeled data 912, model selection from a model registry, model training 914, training, retraining, or updating models, and/or other processing steps. In at least one embodiment, for different machine learning models used by deployment system 906, different training pipelines 1004 may be used. In at least one embodiment, training pipeline 1004, similar to a first example described with respect to FIG. 9, may be used for a first machine learning model, training pipeline 1004, similar to a second example described with respect to FIG. 9, may be used for a second machine learning model, and training pipeline 1004, similar to a third example described with respect to FIG. 9, may be used for a third machine learning model. In at least one embodiment, any combination of tasks within training system 904 may be used depending on what is required for each respective machine learning model. In at least one embodiment, one or more of machine learning models may already be trained and ready for deployment so machine learning models may not undergo any processing by training system 904, and may be implemented by deployment system 906.

In at least one embodiment, output model(s) 916 and/or pre-trained model(s) 1006 may include any types of machine learning models depending on embodiment. In at least one embodiment, and without limitation, machine learning models used by system 1000 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Bi-LSTM, Hopfield, Boltzmann, deep belief, deconvolutional, generative adversarial, liquid state machine, etc.), and/or other types of machine learning models.

In at least one embodiment, training pipelines 1004 may include AI-assisted annotation. In at least one embodiment, labeled data 912 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of feedback data 908 (or other data type used by machine learning models), there may be corresponding ground truth data generated by training system 904. In at least one embodiment, AI-assisted annotation may be performed as part of deployment pipelines 1010; either in addition to, or in lieu of, AI-assisted annotation included in training pipelines 1004. In at least one embodiment, system 1000 may include a multi-layer platform that may include a software layer (e.g., software 918) of diagnostic applications (or other application types) that may perform one or more medical imaging and diagnostic functions.

In at least one embodiment, a software layer may be implemented as a secure, encrypted, and/or authenticated API through which applications or containers may be invoked (e.g., called) from an external environment(s), e.g., facility 902. In at least one embodiment, applications may then call or execute one or more services 920 for performing compute, AI, or visualization tasks associated with respective applications, and software 918 and/or services 920 may leverage hardware 922 to perform processing tasks in an effective and efficient manner.

In at least one embodiment, deployment system 906 may execute deployment pipelines 1010. In at least one embodiment, deployment pipelines 1010 may include any number of applications that may be sequentially, non-sequentially, or otherwise applied to feedback data (and/or other data types), including AI-assisted annotation, as described above. In at least one embodiment, as described herein, a deployment pipeline 1010 for an individual device may be referred to as a virtual instrument for a device. In at least one embodiment, for a single device, there may be more than one deployment pipeline 1010 depending on information desired from data generated by a device.

In at least one embodiment, applications available for deployment pipelines 1010 may include any application that may be used for performing processing tasks on feedback data or other data from devices. In at least one embodiment, because various applications may share common image operations, in some embodiments, a data augmentation library (e.g., as one of services 920) may be used to accelerate these operations. In at least one embodiment, to avoid bottlenecks of conventional processing approaches that rely on CPU processing, parallel computing platform 1030 may be used for GPU acceleration of these processing tasks.

In at least one embodiment, deployment system 906 may include a user interface (UI) 1014 (e.g., a graphical user interface, a web interface, etc.) that may be used to select applications for inclusion in deployment pipeline(s) 1010, arrange applications, modify or change applications or parameters or constructs thereof, use and intera with deployment pipeline(s) 1010 during set-up and/or deployment, and/or to otherwise interact with deployment system 906. In at least one embodiment, although not illustrated with respect to training system 904, UI 1014 (or a different user interface) may be used for selecting models for use in deployment system 906, for selecting models for training, or retraining, in training system 904, and/or for otherwise interacting with training system 904.

In at least one embodiment, pipeline manager 1012 may be used, in addition to an application orchestration system 1028, to manage interaction between applications or containers of deployment pipeline(s) 1010 and services 920 and/or hardware 922. In at least one embodiment, pipeline manager 1012 may be configured to facilitate interactions from application to application, from application to service 920, and/or from application or service to hardware 922. In at least one embodiment, although illustrated as included in software 918, this is not intended to be limiting, and in some examples pipeline manager 1012 may be included in services 920. In at least one embodiment, application orchestration system 1028 (e.g., Kubernetes, DOCKER, etc.) may include a container orchestration system that may group applications into containers as logical units for coordination, management, scaling, and deployment. In at least one embodiment, by associating applications from deployment pipeline(s) 1010 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of other application(s) or container(s). In at least one embodiment, communication, and cooperation between different containers or applications may be aided by pipeline manager 1012 and application orchestration system 1028. In at least one embodiment, so long as an expected input and/or output of each container or application is known by a system (e.g., based on constructs of applications or containers), application orchestration system 1028 and/or pipeline manager 1012 may facilitate communication among and between, and sharing of resources among and between, each of applications or containers. In at least one embodiment, because one or more of applications or containers in deployment pipeline(s) 1010 may share the same services and resources, application orchestration system 1028 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, the scheduler may thus allocate resources to different applications and distribute resources between and among applications in view of requirements and availability of a system. In some examples, the scheduler (and/or other component of application orchestration system 1028) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 920 leveraged and shared by applications or containers in deployment system 906 may include compute services 1016, collaborative content creation services 1017, AI services 1018, simulation services 1019, visualization services 1020, and/or other service types. In at least one embodiment, applications may call (e.g., execute) one or more of services 920 to perform processing operations for an application. In at least one embodiment, compute services 1016 may be leveraged by applications to perform super-computing or other high-performance computing (HPC) tasks. In at least one embodiment, compute service(s) 1016 may be leveraged to perform parallel processing (e.g., using a parallel computing platform 1030) for processing data through one or more of applications and/or one or more tasks of a single application, substantially simultaneously. In at least one embodiment, parallel computing platform 1030 (e.g., NVIDIA's CUDA®) may enable general purpose computing on GPUs (GPGPU) (e.g., GPUs 1022). In at least one embodiment, a software layer of parallel computing platform 1030 may provide access to virtual instruction sets and parallel computational elements of GPUs, for execution of compute kernels. In at least one embodiment, parallel computing platform 1030 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1030 (e.g., where multiple different stages of an application or multiple applications are processing same information). In at least one embodiment, rather than making a copy of data and moving data to different locations in memory (e.g., a read/write operation), same data in the same location of a memory may be used for any number of processing tasks (e.g., at the same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1018 may be leveraged to perform inferencing services for executing machine learning model(s) associated with applications (e.g., tasked with performing one or more processing tasks of an application). In at least one embodiment, AI services 1018 may leverage AI system 1024 to execute machine learning model(s) (e.g., neural networks, such as CNNs) for segmentation, reconstruction, object detection, feature detection, classification, and/or other inferencing tasks. In at least one embodiment, applications of deployment pipeline(s) 1010 may use one or more of output models 916 from training system 904 and/or other models of applications to perform inference on imaging data (e.g., DICOM data, RIS data, CIS data, REST compliant data, RPC data, raw data, etc.). In at least one embodiment, two or more examples of inferencing using application orchestration system 1028 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1028 may distribute resources (e.g., services 920 and/or hardware 922) based on priority paths for different inferencing tasks of AI services 1018.

In at least one embodiment, shared storage may be mounted to AI services 1018 within system 1000. In at least one embodiment, shared storage may operate as a cache (or other storage device type) and may be used to process inference requests from applications. In at least one embodiment, when an inference request is submitted, a request may be received by a set of API instances of deployment system 906, and one or more instances may be selected (e.g., for best fit, for load balancing, etc.) to process a request. In at least one embodiment, to process a request, a request may be entered into a database, a machine learning model may be located from model registry 924 if not already in a cache, a validation step may ensure appropriate machine learning model is loaded into a cache (e.g., shared storage), and/or a copy of a model may be saved to a cache. In at least one embodiment, the scheduler (e.g., of pipeline manager 1012) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as the inference server is running as a different instance.

In at least one embodiment, during application execution, an inference request for a given application may be received, and a container (e.g., hosting an instance of an inference server) may be loaded (if not already loaded), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (turnaround time less than one minute) priority while others may have lower priority (e.g., turnaround less than 10 minutes). In at least one embodiment, model execution times may be measured from requesting institution or entity and may include partner network traversal time, as well as execution on an inference service.

In at least one embodiment, transfer of requests between services 920 and inference applications may be hidden behind a software development kit (SDK), and robust transport may be provided through a queue. In at least one embodiment, a request is placed in a queue via an API for an individual application/tenant ID combination and an SDK pulls a request from a queue and gives a request to an application. In at least one embodiment, a name of a queue may be provided in an environment from where an SDK picks up the request. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1026, and an inference service may perform inferencing on a GPU.

In at least one embodiment, visualization services 1020 may be leveraged to generate visualizations for viewing outputs of applications and/or deployment pipeline(s) 1010. In at least one embodiment, GPUs 1022 may be leveraged by visualization services 1020 to generate visualizations. In at least one embodiment, rendering effects, such as ray-tracing or other light transport simulation techniques, may be implemented by visualization services 1020 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1020 may include an internal visualizer, cinematics, and/or other rendering or image processing capabilities or functionality (e.g., ray tracing, rasterization, internal optics, etc.).

In at least one embodiment, hardware 922 may include GPUs 1022, AI system 1024, cloud 1026, and/or any other hardware used for executing training system 904 and/or deployment system 906. In at least one embodiment, GPUs 1022 (e.g., NVIDIA's TESLA® and/or QUADRO® GPUs) may include any number of GPUs that may be used for executing processing tasks of compute services 1016, collaborative content creation services 1017, AI services 1018, simulation services 1019, visualization services 1020, other services, and/or any of features or functionality of software 918. For example, with respect to AI services 1018, GPUs 1022 may be used to perform pre-processing on imaging data (or other data types used by machine learning models), post-processing on outputs of machine learning models, and/or to perform inferencing (e.g., to execute machine learning models). In at least one embodiment, cloud 1026, AI system 1024, and/or other components of system 1000 may use GPUs 1022. In at least one embodiment, cloud 1026 may include a GPU-optimized platform for deep learning tasks. In at least one embodiment, AI system 1024 may use GPUs, and cloud 1026—or at least a portion tasked with deep learning or inferencing—may be executed using one or more AI systems 1024. As such, although hardware 922 is illustrated as discrete components, this is not intended to be limiting, and any components of hardware 922 may be combined with, or leveraged by, any other components of hardware 922.

In at least one embodiment, AI system 1024 may include a purpose-built computing system (e.g., a super-computer or an HPC) configured for inferencing, deep learning, machine learning, and/or other artificial intelligence tasks. In at least one embodiment, AI system 1024 (e.g., NVIDIA's DGX™) may include GPU-optimized software (e.g., a software stack) that may be executed using a plurality of GPUs 1022, in addition to CPUs, RAM, storage, and/or other components, features, or functionality. In at least one embodiment, one or more AI systems 1024 may be implemented in cloud 1026 (e.g., in a data center) for performing some or all of AI-based processing tasks of system 1000.

In at least one embodiment, cloud 1026 may include a GPU-accelerated infrastructure (e.g., NVIDIA's NGC™) that may provide a GPU-optimized platform for executing processing tasks of system 1000. In at least one embodiment, cloud 1026 may include an AI system(s) 1024 for performing one or more of AI-based tasks of system 1000 (e.g., as a hardware abstraction and scaling platform). In at least one embodiment, cloud 1026 may integrate with application orchestration system 1028 leveraging multiple GPUs to enable seamless scaling and load balancing between and among applications and services 920. In at least one embodiment, cloud 1026 may be tasked with executing at least some of services 920 of system 1000, including compute services 1016, AI services 1018, and/or visualization services 1020, as described herein. In at least one embodiment, cloud 1026 may perform small and large batch inference (e.g., executing NVIDIA's TensorRT™), provide an accelerated parallel computing API and platform 1030 (e.g., NVIDIA's CUDA®), execute application orchestration system 1028 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1000.

In at least one embodiment, in an effort to preserve patient confidentiality (e.g., where patient data or records are to be used off-premises), cloud 1026 may include a registry, such as a deep learning container registry. In at least one embodiment, a registry may store containers for instantiations of applications that may perform pre-processing, post-processing, or other processing tasks on patient data. In at least one embodiment, cloud 1026 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, a number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transforms that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as a system may embody one or more methods and methods may be considered a system.

In the present document, references may be made to obtaining, acquiring, receiving, or inputting analog or digital data into a subsystem, computer system, or computer-implemented machine. In at least one embodiment, a process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

obtaining a synthetic embedding using two or more learned embeddings associated with different speakers, at least one of the two or more learned embeddings being generated using a multi-stage training of a machine learning model (MLM) that was based at least on:

a first plurality of training utterances of a first quality during a first stage of the multi-stage training; and a second plurality of training utterances of a second quality during a second stage of the multi-stage training, the second quality being higher than the first quality; and generating audio data corresponding to a text representation based at least on the MLM processing the text representation and the synthetic embedding.

2. The method of claim 1, wherein the first quality of the first plurality of training utterances is characterized by a lower signal-to-noise ratio than the second quality of the second plurality of training utterances, wherein the first plurality of training utterances are associated with a first plurality of speakers and the second plurality of training utterances are associated with a second plurality of speakers, a number of the first plurality of speakers being larger than a number of the second plurality of speakers.

3. The method of claim 1, wherein the synthetic embedding is obtained, at least, by computing a weighted combination of the two or more learned embeddings.

4. The method of claim 3, wherein weights in the weighted combination of the two or more learned embeddings are selected randomly.

5. The method of claim 1, wherein the MLM comprises at least one transformer neural subnetwork with one or more attention layers.

6. The method of claim 1, wherein the MLM comprises:

a first subnetwork to associate units of the audio data with respective units of the text representation; and a second subnetwork to determine durations of the units of the audio data.

7. The method of claim 6, wherein the first subnetwork and the second subnetwork comprise one or more convolutional layers and one or more fully connected layers.

8. The method of claim 1, wherein the text representation comprises a text embedding, and the text embedding is applied to the MLM in combination with the synthetic embedding.

9. A method comprising:

obtaining a plurality of sets of training data, two or more sets of training data of the plurality of sets of training data being associated with a different audio quality (AQ) index characterizing audio quality of a corresponding set of training data, at least one set of training data of the plurality of sets of training data comprising:

a training input comprising a batch of text representations, and a target output comprising a batch of audio data; and training a machine learning model (MLM) using a plurality of training stages, at least one training stage of the plurality of training stages comprising applying the at least one set of training data to the MLM to generate learned embeddings corresponding to respective speakers associated with the at least one set of training data.

10. The method of claim 9, wherein at least one of:

the plurality of training stages are performed in an order of decreasing number of speakers associated with the at least one set of the training data; or the plurality of training stages are performed in an order of increasing AQ index associated with the at least one set of training data.

11. The method of claim 9, wherein the MLM comprises at least one transformer neural subnetwork having one or more attention layers.

12. The method of claim 9, wherein one or more of the plurality of training stages comprise:

selecting a text representation from the batch of text representations of the training input for a corresponding training stage of the one or more training stages;

selecting audio data from the batch of audio data of the target output for the corresponding training stage;

training a first subnetwork of the MLM to associate units of the selected audio data with correct units of the selected text representation; and training a second subnetwork of the MLM to determine duration of the units of the selected audio data.

13. The method of claim 12, wherein the units of the selected audio data comprise speech spectrograms.

14. The method of claim 12, wherein the first subnetwork and the second subnetwork comprise one or more convolutional layers of neurons and one or more fully connected layers of neurons.

15. The method of claim 14, wherein the one or more training stages of the plurality of training stages further comprise:

obtaining an output of the MLM comprising synthetic audio data generated for the selected text representation, the target speaker ID, and the embedding for the target speaker; and modifying the embedding for the target speaker based on a difference between the synthetic audio data and the selected audio data.

16. The method of claim 9, wherein one or more training stages of the plurality of training stages comprise:

selecting a text representation from the batch of text representations of the training input for a corresponding training stage of the one or more training stages;

selecting audio data from the batch of audio data of the target output for the corresponding training stage;

obtaining a target speaker identification (ID) identifying a target speaker associated with the selected audio data; and applying, to the MLM, at least:

the selected text representation, the target speaker ID, and an embedding for the target speaker.

17. The method of claim 16, wherein the one or more training stages of the plurality of training stages further comprise:

obtaining an output of the MLM comprising synthetic audio data generated for the selected text representation, the target speaker ID, and the embedding for the target speaker; and modifying parameters of the MLM based on a difference between the synthetic audio data and the selected audio data.

18. A system comprising:

one or more processing units to cause presentation of synthetic speech generated based at least on one or more machine learning models (MLMs) processing a synthetic embedding and an associated textual representation, the synthetic embedding generated based at least on combining two or more learned embeddings corresponding to two or more different speakers, wherein at least one MLM of the one or more MLMs is trained using a multi-stage training process where respective stages include different audio quality (AQ) indexes associated with respective sets of training data corresponding to the respective stage.

19. The system of claim 18, wherein the system is comprised in at least one of:

an in-vehicle infotainment system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system for generating or presenting at least one of virtual reality content, mixed reality content, or augmented reality content;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

* * * * *